US011990079B2

(12) United States Patent
Kim et al.

(10) Patent No.: US 11,990,079 B2
(45) Date of Patent: May 21, 2024

(54) DISPLAY DEVICE

(71) Applicant: Samsung Display Co., Ltd., Yongin-si (KR)

(72) Inventors: Sunho Kim, Seongnam-si (KR); Juchan Park, Seoul (KR); Gun Hee Kim, Seoul (KR); Hyewon Kim, Seoul (KR); Taehoon Yang, Yongin-si (KR); Sun Hee Lee, Hwaseong-si (KR); Joohee Jeon, Hwaseong-si (KR); Sungjin Hong, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/465,845

(22) Filed: Sep. 3, 2021

(65) Prior Publication Data

US 2022/0157221 A1 May 19, 2022

(30) Foreign Application Priority Data

Nov. 13, 2020 (KR) ........................ 10-2020-0152059

(51) Int. Cl.
*G09G 3/20* (2006.01)

(52) U.S. Cl.
CPC ..... *G09G 3/2092* (2013.01); *G09G 2310/027* (2013.01); *G09G 2320/0673* (2013.01)

(58) Field of Classification Search
CPC ........... G09G 3/2092; G09G 2310/027; G09G 2320/0673; G09G 2310/0267; G09G 2320/0233; G09G 3/20; G09G 3/3225; G09G 3/344; G09G 3/348; G09G 2380/02; G09G 2310/0275; G09G 2340/04; H10K 59/121
See application file for complete search history.

(56) References Cited

U.S. PATENT DOCUMENTS

| | | | | |
|---|---|---|---|---|
| 8,629,842 | B2 | 1/2014 | Jang | |
| 9,019,170 | B2 * | 4/2015 | Kim | G06F 3/041 345/173 |
| 9,825,112 | B2 | 11/2017 | Zou | |
| 10,074,320 | B1 * | 9/2018 | Botzas | G09G 3/348 |
| 10,095,272 | B2 * | 10/2018 | Park | G09G 3/3611 |

(Continued)

FOREIGN PATENT DOCUMENTS

| | | |
|---|---|---|
| KR | 10-84169 | 11/2011 |
| KR | 10-2016-0030628 | 3/2016 |

(Continued)

*Primary Examiner* — Jose R Soto Lopez
(74) *Attorney, Agent, or Firm* — CANTOR COLBURN LLP

(57) ABSTRACT

A display device includes a display panel including a plurality of first pixels disposed in a first display area and a plurality of second pixels disposed in a second display area adjacent to the first display area, a gate driver disposed in the second display area of the display panel to overlap a portion of the second pixels and driving the first and second pixels, a controller receiving image data and converting the image data to image signals, and a data driver converting the image signals to data signals and outputting the data signals to the first and second pixels. The controller compensates for effective data corresponding to the second pixels and reflects the compensated effective data to the image signals.

7 Claims, 26 Drawing Sheets

(56) References Cited

U.S. PATENT DOCUMENTS 10,127,848 B2 * 11/2018 Kang .................... G09G 3/03
10,134,318 B2 * 11/2018 Kim .................... G09G 3/20
10,411,083 B2 9/2019 Song et al.
10,586,511 B2 * 3/2020 Yang .................... G09G 5/10
10,748,467 B2 * 8/2020 Yang .................... G09G 3/2003
10,885,831 B2 * 1/2021 Yang .................... G09G 3/20
10,923,537 B2 * 2/2021 Zhang .................... H10K 59/352
11,100,833 B2 * 8/2021 Xu .................... G09G 3/035
11,150,862 B2 * 10/2021 Cui .................... G06F 1/1647
11,170,739 B2 * 11/2021 Li .................... G09G 3/20
11,322,100 B2 * 5/2022 Chen .................... G02F 1/13306
2011/0227958 A1 * 9/2011 Park .................... G09G 3/20
345/88
2012/0268445 A1 * 10/2012 Ogata .................... H05B 45/60
345/212
2013/0033434 A1 * 2/2013 Richardson .................... H04M 1/0269
345/173
2015/0254045 A1 * 9/2015 Drake .................... G06Q 30/0261
345/1.3
2015/0287365 A1 * 10/2015 Song .................... G09G 3/20
345/82
2016/0217734 A1 * 7/2016 Chaji .................... G09G 3/3225
2016/0372064 A1 * 12/2016 Chen .................... G09G 3/3648
2017/0031642 A1 * 2/2017 Lee .................... G09G 3/20
2017/0192313 A1 * 7/2017 Long .................... H01L 27/1251
2017/0330531 A1 * 11/2017 Yamazaki .................... G09G 5/14
2017/0345353 A1 * 11/2017 Lin .................... G09G 3/2003
2017/0371465 A1 * 12/2017 Ahn .................... H10K 59/131
2018/0047799 A1 * 2/2018 Lim .................... H10K 59/123
2018/0130397 A1 * 5/2018 Zheng .................... G09G 3/207
2018/0151612 A1 * 5/2018 Zheng .................... G09G 3/3611
2018/0160150 A1 * 6/2018 Wu .................... H04N 19/85
2018/0173036 A1 * 6/2018 Kim .................... G02F 1/133524
2018/0226012 A1 * 8/2018 Sim .................... G09G 3/2096
2018/0247582 A1 * 8/2018 Park .................... G06F 1/1626
2018/0247985 A1 * 8/2018 Jeon .................... H10K 59/353
2018/0249584 A1 * 8/2018 Kim .................... G06F 1/1637
2018/0330682 A1 * 11/2018 Zhang .................... G09G 3/22
2019/0073962 A1 * 3/2019 Aflatooni .................... G09G 3/3275
2019/0088188 A1 * 3/2019 Zheng .................... G02F 1/133707
2019/0108793 A1 * 4/2019 Kim .................... H10K 50/84
2019/0181363 A1 * 6/2019 Lee .................... H10K 50/828
2019/0259345 A1 * 8/2019 Hosoyachi .................... G02F 1/133514
2019/0311668 A1 * 10/2019 Marchya .................... G09G 3/2096
2019/0362678 A1 * 11/2019 Shin .................... H01L 27/124
2020/0029059 A1 * 1/2020 Chahine .................... H04N 5/33
2020/0111401 A1 * 4/2020 Zhao .................... G09G 3/2003
2020/0279536 A1 * 9/2020 Li .................... G09G 3/2074
2020/0296843 A1 * 9/2020 Gao .................... G02F 1/133305
2020/0342799 A1 * 10/2020 Yang .................... H01L 27/14812
2021/0049950 A1 * 2/2021 Bae .................... G09G 5/37
2021/0065625 A1 * 3/2021 Wang .................... H10K 59/35
2021/0090486 A1 * 3/2021 Zhang .................... G09G 3/32
2021/0098541 A1 * 4/2021 Hei .................... G06T 7/143
2021/0134242 A1 * 5/2021 Hei .................... G09G 5/02
2021/0151483 A1 * 5/2021 Feng .................... G09G 3/3225
2021/0166654 A1 * 6/2021 Yu .................... G09G 3/2011
2021/0174754 A1 * 6/2021 Yang .................... G06N 20/00
2021/0201842 A1 * 7/2021 Ko .................... G09G 3/03
2021/0210010 A1 * 7/2021 Gao .................... G09G 3/3225
2021/0225997 A1 * 7/2021 Tsai .................... H10K 59/873
2021/0296425 A1 * 9/2021 Ochi .................... H10K 59/131
2021/0335223 A1 * 10/2021 Shen .................... G09G 3/3208
2021/0335293 A1 * 10/2021 Lee .................... G09G 3/3607
2021/0335910 A1 * 10/2021 Tan .................... H04M 1/0266
2021/0343222 A1 * 11/2021 Hei .................... G09G 3/3233
2021/0358379 A1 * 11/2021 Li .................... H10K 59/121
2021/0375239 A1 * 12/2021 Bae .................... G09G 3/3208
2022/0013083 A1 * 1/2022 Cheng .................... G09F 9/30
2022/0013611 A1 * 1/2022 Park .................... H10K 59/353
2022/0028311 A1 * 1/2022 Matsueda .................... G09G 3/006
2022/0028335 A1 * 1/2022 Matsueda .................... G06F 3/0412
2022/0059011 A1 * 2/2022 Li .................... G07F 17/34
2022/0068219 A1 * 3/2022 Yoo .................... G09G 3/3258
2022/0093682 A1 * 3/2022 Chang .................... H10K 59/121
2022/0139331 A1 * 5/2022 Jang .................... G09G 3/3275
345/55
2022/0139336 A1 * 5/2022 Jeon .................... H10K 59/65
345/694
2022/0309983 A1 * 9/2022 Choi .................... G09G 3/3275
2022/0366825 A1 * 11/2022 Niu .................... G06F 3/04897
2023/0011676 A1 * 1/2023 Lin .................... G06F 3/1431

FOREIGN PATENT DOCUMENTS

KR 10-2017-0047446 5/2017
KR 10-1878189 7/2018
KR 10-2019-0038718 4/2019
KR 10-2019-0071159 6/2019
KR 10-2098161 4/2020

* cited by examiner

DISPLAY DEVICE

CROSS-REFERENCE TO RELATED APPLICATION

This application claims priority from and the benefit of Korean Patent Application No. 10-2020-0152059, filed on Nov. 13, 2020, which is hereby incorporated by reference for all purposes as if fully set forth herein.

BACKGROUND

Field

Embodiments of the inventive concepts relate generally to a display device. More particularly, the inventive concepts relates to a display device having an expanded display area.

Discussion of the Background

Various electronic devices applied to multimedia devices, such as television sets, mobile phones, tablet computers, navigation units, or game units, are being developed.

In recent years, research has been conducted to reduce an area in which no image is displayed in the electronic devices in line with market needs. In addition, research to expand an area through which an image is provided to a user in the electronic devices has also been conducted.

The above information disclosed in this Background section is only for understanding of the background of the inventive concepts, and, therefore, it may contain information that does not constitute prior art.

SUMMARY

The inventive concepts provide a display device having an expanded display device by reducing a width of a bezel area.

Additional features of the inventive concepts will be set forth in the description which follows, and in part will be apparent from the description, or may be learned by practice of the inventive concepts.

Embodiments of the inventive concept provide a display device including a display panel including a plurality of first pixels disposed in a first display area and a plurality of second pixels disposed in a second display area adjacent to the first display area, a gate driver disposed in the second display area of the display panel to overlap some of the second pixels and driving the first and second pixels, a controller receiving image data and converting the image data to image signals, and a data driver converting the image signals to data signals and outputting the data signals to the first and second pixels. The controller compensates for effective data corresponding to the second pixels and reflects the compensated effective data to the image signals.

Embodiments of the inventive concept provide a display device including a display panel including a plurality of first pixels disposed in a first display area and a plurality of second pixels disposed in a second display area adjacent to the first display area, a gate driver disposed in the second display area of the display panel to overlap some of the second pixels and driving the first and second pixels, a controller receiving image data and converting the image data to first image signals corresponding to the first pixels and second image signals corresponding to the second pixels, and a data driver converting the first image signals to first data signals applied to the first pixels and converting the second image signals to second data signals applied to the second pixels.

According to the embodiments described herein, a peripheral area of the first display area where the gate driver is disposed is utilized as the second display area displaying an image. Thus, the width of the bezel area in the display device decreases.

In addition, a difference in brightness between the second display area and the first display area is improved, and thus, overall display quality of the display device is improved.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

DETAILED DESCRIPTION

Figure 1A:
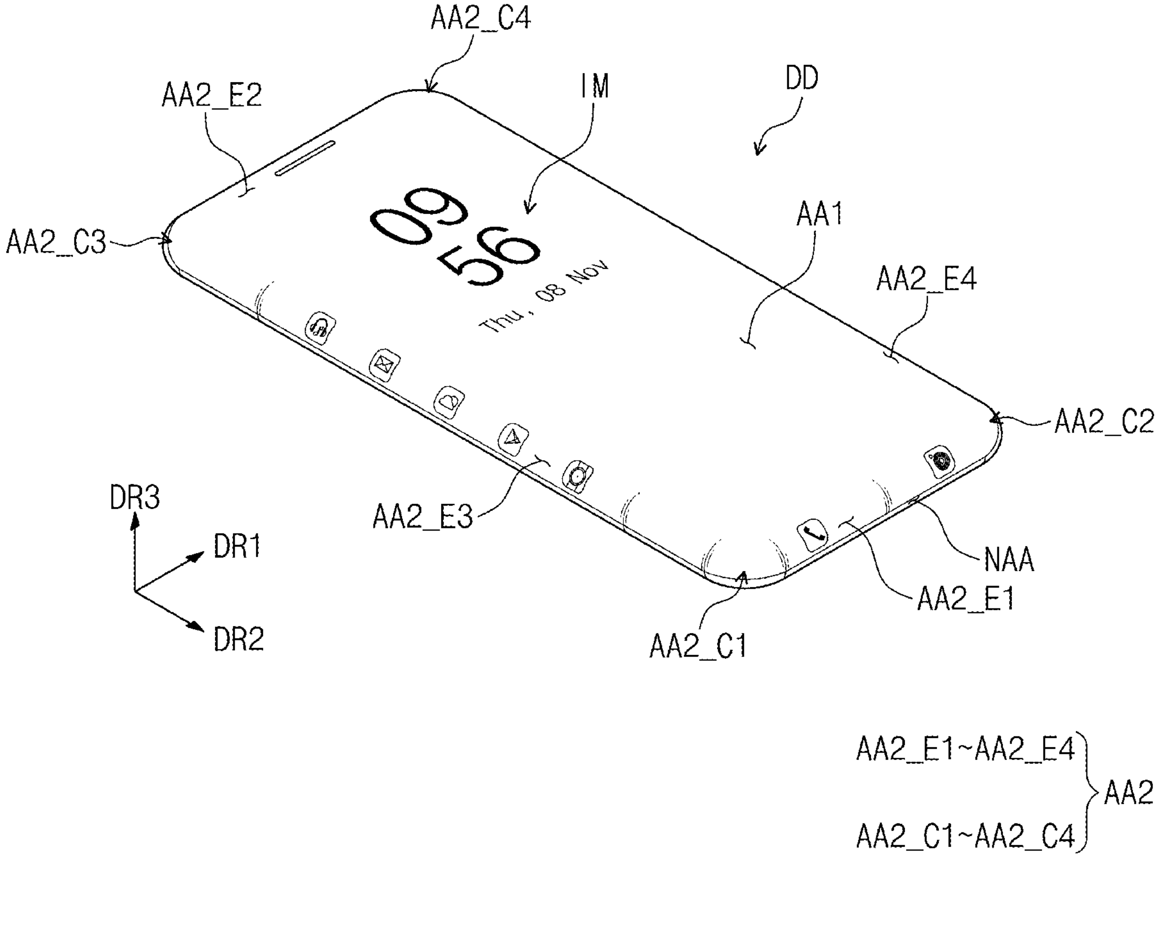
FIG. 1A is a perspective view illustrating a display device according to an embodiment of the inventive concepts.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are illustrated in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

In the inventive concepts, it will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

Like numerals refer to like elements throughout. The thickness and the ratio and the dimension of the element are exaggerated for effective description of the technical contents. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The terminology used herein is for the purpose of describing particular embodiments only and is not intended to be limiting of the invention. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be further understood that the terms "may include" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the inventive concepts will be explained in detail with reference to the accompanying drawings.

Figure 1B:
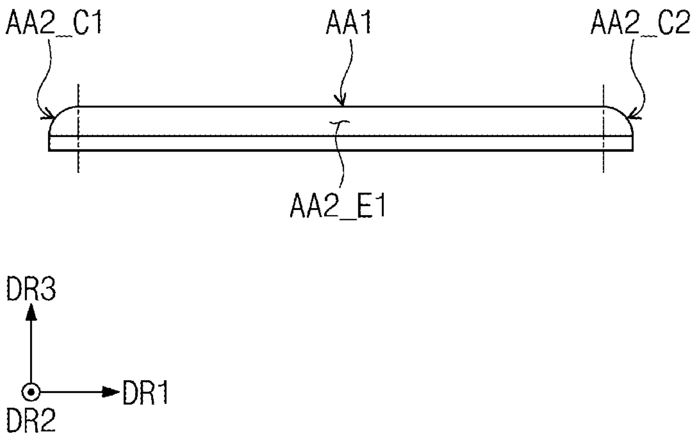
FIG. 1B is a side view illustrating the display device shown in FIG. 1A when viewed in a second direction.
Figure 1C:
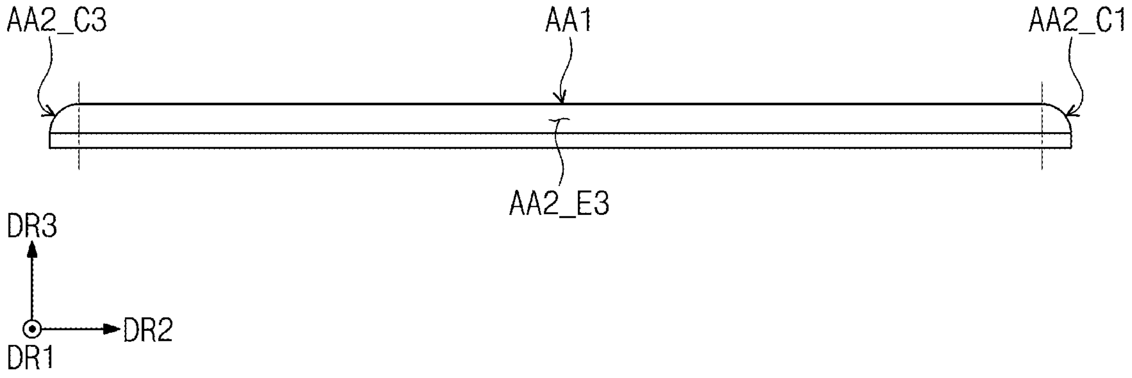
FIG. 1C is a side view illustrating the display device shown in FIG. 1A when viewed in a first direction.

FIG. 1A is a perspective view illustrating a display device DD according to an embodiment of the inventive concepts, FIG. 1B is a side view illustrating the display device DD shown in FIG. 1A when viewed in a second direction DR2, and FIG. 1C is a side view illustrating the display device DD shown in FIG. 1A when viewed in a first direction DR1.

FIGS. 1A to 1C show a smartphone as a representative example of the display device DD, however, the display device DD is not limited to a smartphone. That is, the display device DD of the inventive concepts may also be applied to a large-sized electronic item, such as a television set, a monitor, or the like, and a small and medium-sized electronic item, such as a mobile phone, a tablet computer, a car navigation unit, a game unit, a smart watch, or the like.

The display device DD may include active areas AA1 and AA2 in which an image IM is displayed and a peripheral area NAA in which the image IM is not displayed. In FIG. 1A, as an example of the image IM, date, time, and icon images are illustrated.

The active areas AA1 and AA2 may include a first active area AA1 having a plane shape and a second active area AA2 extended from the first active area AA1. The second active area AA2 may be bent from the first active area AA1 at a predetermined curvature, however, the shape of the second active area AA2 should not be limited thereto or thereby. For example, the second active area AA2 may have a plane shape that is substantially parallel to, inclined to, or perpendicular to the first active area AA1. The first and second active areas AA1 and AA2 are areas classified according to their shape and may be actually implemented in a single display surface. The peripheral area NAA is an area in which the image IM is not displayed. A bezel area may be defined in the display device DD by the peripheral area NAA.

The first active area AA1 may be substantially parallel to a plane defined by the first direction DR1 and the second direction DR2. A normal line direction of the first active area AA1, i.e., a thickness direction of the display device DD, may be substantially parallel to a third direction DR3. Front (or upper) and rear (or lower) surfaces of each member of the display device DD may be defined with respect to the third direction DR3. However, the first, second, and third directions DR1, DR2, and DR3 may be relative to each other and may be changed to other directions.

The second active area AA2 may be an area that is bent and extend from the first active area AA1. The second active area AA2 may include edge active areas AA2_E1 to AA2_E4 bent from sides of the first active area AA1 and corner active areas AA2_C1 to AA2_C4 bent from corners of the first active area AA1. The second active area AA2 may include a first edge active area AA2_E1 bent from a first side of the first active area AA1, a second edge active area AA2_E2 bent from a second side of the first active area AA1, a third edge active area AA2_E3 bent from a third side of the first active area AA1, and a fourth edge active area AA2_E4 bent from a fourth side of the first active area AA1. Each of the first to fourth edge active areas AA2_E1 to AA2_E4 may be curved at a predetermined curvature in the third direction DR3. Each of the first to fourth edge active areas AA2_E1 to AA2_E4 may have a single curved surface. In FIG. 1A, the first to fourth edge active areas AA2_E1 to AA2_E4 curved at the same curvature are illustrated, however, the inventive concepts should not be limited thereto or thereby. As an example, the first and second edge active areas AA2_E1 and AA2_E2 may be bent at a curvature different from that of the third and fourth edge active areas AA2_E3 and AA2_E4.

The second active area AA2 may further include a first corner active area AA2_C1 bent from a first corner of the first active area AA1, a second corner active area AA2_C2 bent from a second corner of the first active area AA1, a third corner active area AA2_C3 bent from a third corner of the first active area AA1, and a fourth corner active area AA2_C4 bent from a fourth corner of the first active area AA1.

The first corner active area AA2_C1 may be disposed between the first edge active area AA2_E1 and the third edge active area AA2_E3, and the second corner active area AA2_C2 may be disposed between the first edge active area AA2_E1 and the fourth edge active area AA2_E4. The third corner active area AA2_C3 may be disposed between the second edge active area AA2_E2 and the third edge active area AA2_E3, and the fourth corner active area AA2_C4 may be disposed between the second edge active area AA2_E2 and the fourth edge active area AA2_E4.

Each of the first to fourth corner active areas AA2_C1 to AA2_C4 may be bent at a predetermined curvature in the third direction DR3. Each of the first to fourth corner active areas AA2_C1 to AA2_C4 may have a double curved surface.

The number of the edge active areas AA2_E1 to AA2_E4 and the number of the corner active areas AA2_C1 to AA2_C4 should not be limited thereto or thereby. That is, the number of the edge active areas AA2_E1 to AA2_E4 and the number of the corner active areas AA2_C1 to AA2_C4, which are included in the second active area AA2, may be changed depending on the shape of the first active area AA1. In addition, at least one of the edge active areas AA2_E1 to AA2_E4 and the corner active areas AA2_C1 to AA2_C4 may be omitted.

According to an embodiment of the inventive concepts, a first image displayed through the first active area AA1 and a second image displayed through the second active area AA2 may be dependent on each other. For instance, a picture, a scene in a movie, or a UX/UI design may be formed by the combination of the first image and the second image. Aesthetics of the display device DD may be improved due to the second active area AA2 curved at the predetermined curvature, and a size of the peripheral area NAA perceived by a user may be reduced.

However, embodiments are not limited thereto. First images displayed through the first active area AA1 and second images displayed through the second active area AA2 may be independent from each other.

Figure 2A:
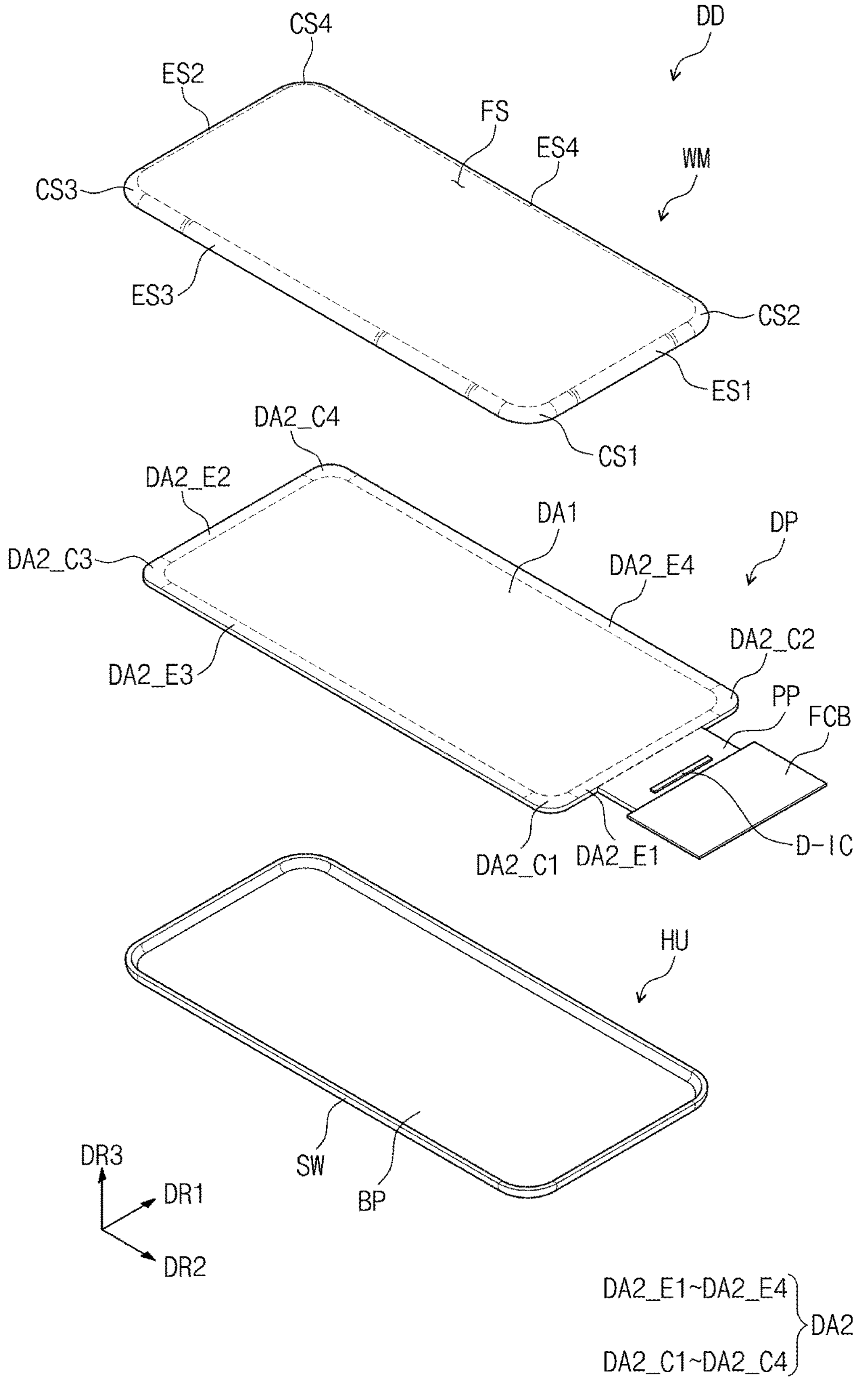
FIG. 2A is an exploded perspective view illustrating a display device according to an embodiment of the inventive concepts.
Figure 2B:
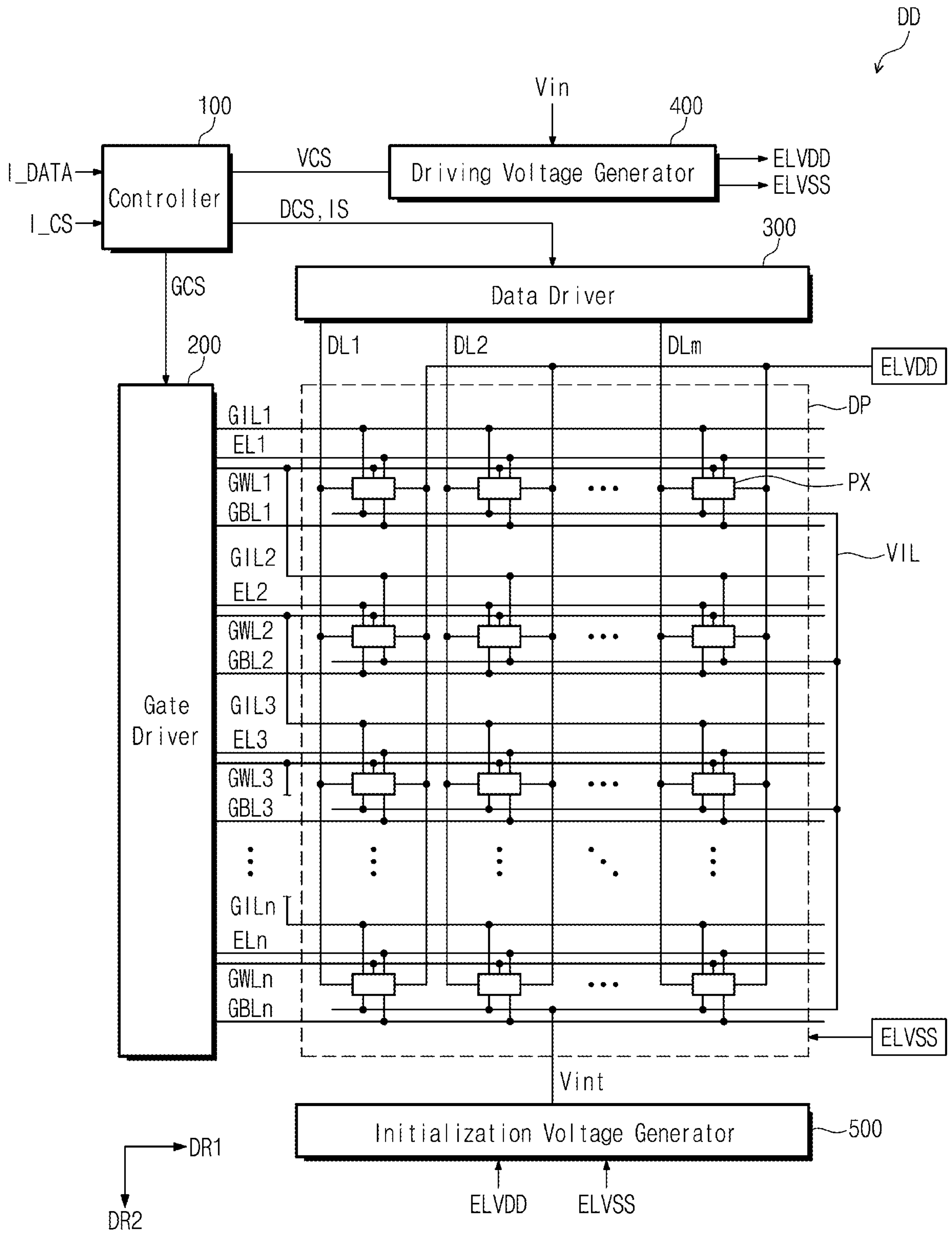
FIG. 2B is a block diagram illustrating a display device according to an embodiment of the inventive concepts.
Figure 2C:
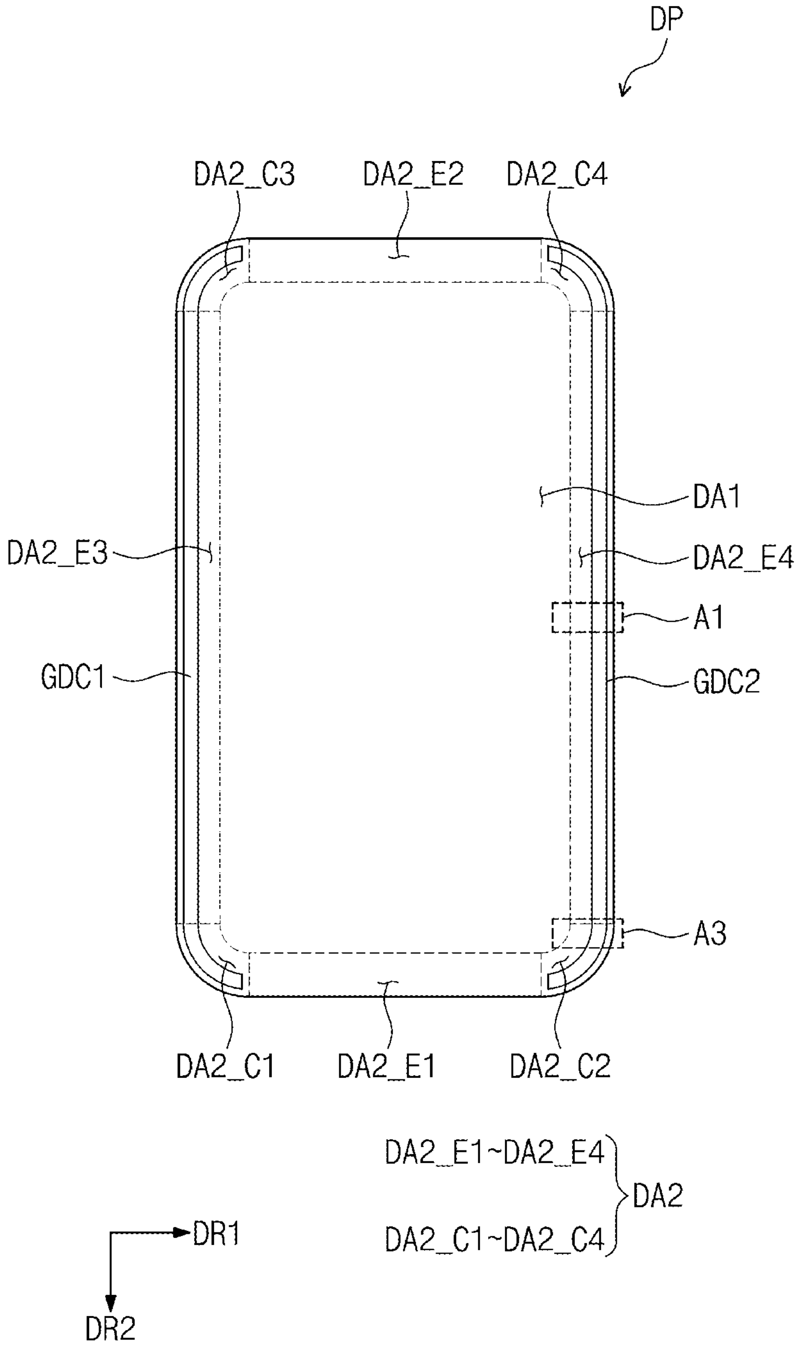
FIGS. 2C and 2D are plan views illustrating a display panel according to an embodiment of the inventive concepts.
Figure 2D:
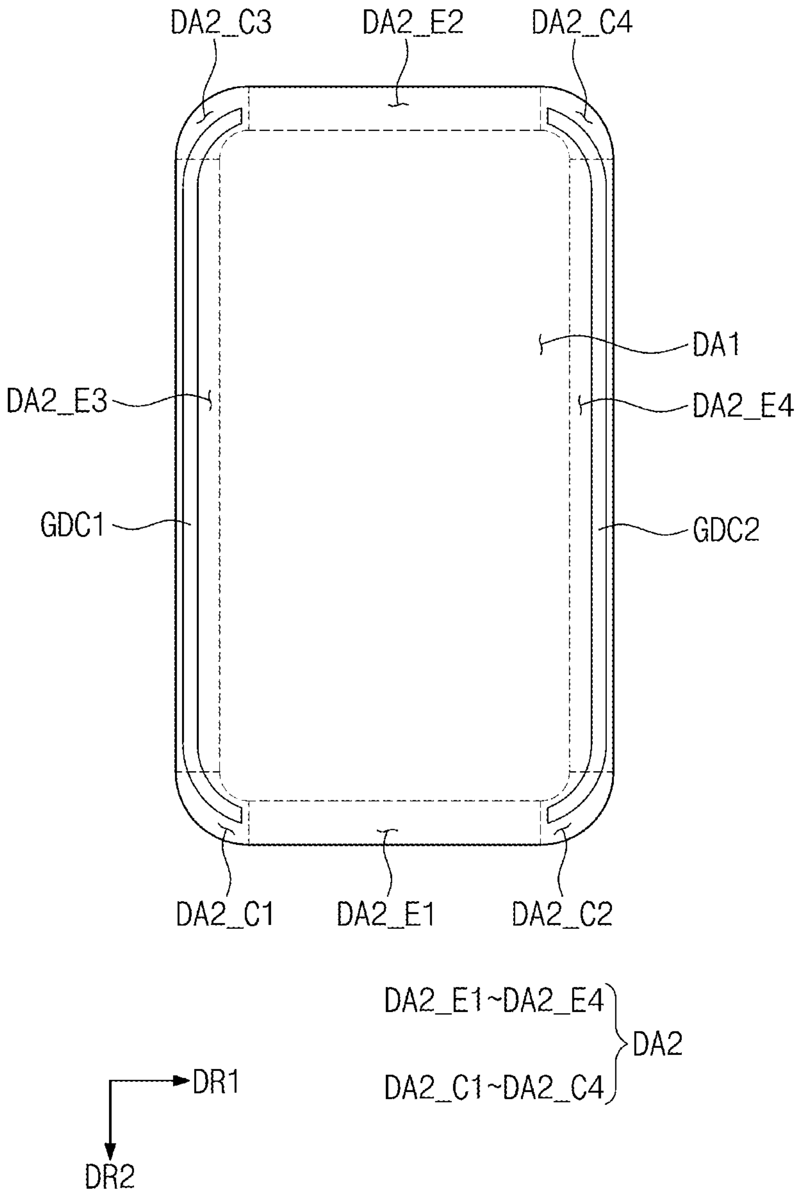

FIG. 2A is an exploded perspective view illustrating the display device DD according to an embodiment of the inventive concepts. FIG. 2B is a block diagram illustrating the display device DD according to an embodiment of the inventive concepts. FIGS. 2C and 2D are plan views illustrating a display panel DP according to an embodiment of the inventive concepts.

Referring to FIG. 2A, the display device DD may include a window WM, a display panel DP, and a housing HU. The window WM may protect an upper surface of the display panel DP. The window WM may be optically transparent. Accordingly, the image displayed through the display panel DP may be perceived by the user through the window WM. That is, a display surface of the display device DD may be defined by the window WM. The window WM may be implemented by a glass, plastic, or film.

The window WM may have a curved surface structure. The window WM may include a front surface portion FS and one or more curved surface portions bent from the front surface portion FS. In this case, the front surface portion FS and the one or more curved surface portions may be referred to as a transmission portion that transmits an image or a light. The front surface portion FS of the window WM may define the first active area AA1 (refer to FIG. 1A) of the display device DD, and the one or more curved surface portions may define the second active area AA2 (refer to FIG. 1A).

As an example, the window WM may include four curved surface portions, i.e., a first curved surface portion ES1, a second curved surface portion ES2, a third curved surface portion ES3, and a fourth curved surface portion ES4. In the present embodiment, the front surface portion FS may be a plane defined by the first direction DR1 and the second direction DR2. The front surface portion FS may be a plane substantially perpendicular to the third direction DR3. Each of the first to fourth curved surface portions ES1 to ES4 may be bent from the front surface portion FS. Each of the first curved surface portion ES1 and the second curved surface portion ES2 may be bent from the front surface portion FS. The first and second curved surface portions ES1 and ES2 may be respectively bent from first and second sides of the front surface portion FS. The first and second sides of the front surface portion FS may be substantially parallel to the first direction DR1. The first curved surface portion ES1 and the second curved surface portion ES2 may be disposed parallel to each other in the first direction DR1. Each of the third curved surface portion ES3 and the fourth curved surface portion ES4 may be bent from the front surface portion FS. In particular, the third and fourth curved surface portions ES3 and ES4 may be respectively bent from third and fourth sides of the front surface portion FS. The third and fourth sides of the front surface portion FS may be substantially parallel to the second direction DR2. The third curved surface portion ES3 and the fourth curved surface portion ES4 may be disposed parallel to each other in the second direction DR2.

The first to fourth curved surface portions ES1 to ES4 may be bent from the front surface portion FS at a predetermined curvature. As an example, the first to fourth curved surface portions ES1 to ES4 may have the same curvature as each other. As another example, the first and second curved surface portions ES1 and ES2 may have the same curvature as each other, and the third and fourth curved surface portions ES3 and ES4 may have the same curvature as each other. However, the first and second curved surface portions ES1 and ES2 may have a curvature different from that of the third and fourth curved surface portions ES3 and ES4.

The window WM may further include at least one corner portion. As an example, the window WM may further include four corner portions, i.e., a first corner portion CS1, a second corner portion CS2, a third corner portion CS3, and a fourth corner portion CS4. Each of the first to fourth corner portions CS1 to CS4 may include at least two curvatures. Each of the first to fourth corner portions CS1 to CS4 may have a shape in which curved surfaces having different curvatures from each other are consecutively connected to each other.

The first corner portion CS1 may be disposed between the first curved surface portion ES1 and the third curved surface portion ES3 to connect the first and third curved surface portions ES1 and ES3. The second corner portion CS2 may be disposed between the first curved surface portion ES1 and the fourth curved surface portion ES4 to connect the first curved surface portion ES1 and the fourth curved surface portion ES4. The third corner portion CS3 may be disposed between the second curved surface portion ES2 and the third curved surface portion ES3 to connect the second and third curved surface portions ES2 and ES3. The fourth corner portion CS4 may be disposed between the second curved surface portion ES2 and the fourth curved surface portion ES4 to connect the second and fourth curved surface portions ES2 and ES4. Each of the first to fourth corner portions CS1 to CS4 may be referred to as the transmission portion that transmits the image or the light.

Referring to FIGS. 2A and 2C, the display panel DP may include a display area displaying the image. As an example, the display area may include a first display area DA1 and a second display area DA2. The first display area DA1 may be disposed parallel to the front surface portion FS of the window WM and may have a shape corresponding to the front surface portion FS. That is, the first display area DA1 may be a flat display area having a flat shape. The second display area DA2 may be disposed to correspond to one or more curved surface portions and one or more corner portions. The second display area DA2 may have a curved surface shape corresponding to one or more curved surface portions and one or more corner portions. However, the shape of the second display area DA2 should not be limited thereto or thereby, and the second display area DA2 may also have the flat shape.

The second display area DA2 may include first to fourth edge display areas DA2_E1 to DA2_E4 disposed to respectively correspond to the first to fourth curved surface portions ES1 to ES4. The first and second edge display areas DA2_E1 and DA2_E2 may be bent from first and second sides of the first display area DA1 and may be disposed to correspond to the first and second curved surface portions ES1 and ES2 of the window WM, respectively. The first and second sides of the first display area DA1 may extend parallel to the first direction DR1. The first and second edge display areas DA2_E1 and DA2_E2 may be bent from the first display area DA1 at a predetermined curvature.

The third and fourth edge display areas DA2_E3 and DA2_E4 may be bent from third and fourth sides of the first display area DA1 and may be disposed to correspond to the third and fourth curved surface portions ES3 and ES4 of the window WM, respectively. The third and fourth sides of the first display area DA1 may extend parallel to the second direction DR2. The third and fourth edge display areas DA2_E3 and DA2_E4 may be bent from the first display area DA1 at a predetermined curvature.

In the above descriptions of the display panel DP, the structure of the display panel DP in which the second display area DA2 includes four edge display areas DA2_E1 to DA2_E4 is described, however, the structure of the display panel DP according to the inventive concepts should not be limited thereto or thereby. That is, the second display area DA2 of the display panel DP may include only one edge display area or may include only two edge display areas that are provided at the first and second sides of the first display area DA1 or at the third and fourth sides of the first display area DA1.

The second display area DA2 may further include first to fourth corner display areas DA2_C1 to DA2_C4 disposed to correspond to the first to fourth corner portions CS1 to CS4 of the window WM, respectively. The first corner display area DA2_C1 may be disposed between the first and third edge display areas DA2_E1 and DA2_E3, and the second corner display area DA2_C2 may be disposed between the first and fourth edge display areas DA2_E1 and DA2_E4. In addition, the third corner display area DA2_C3 may be disposed between the second and third edge display areas DA2_E2 and DA2_E3, and the fourth corner display area DA2_C4 may be disposed between the second and fourth edge display areas DA2_E2 and DA2_E4. The first to fourth corner display areas DA2_C1 to DA2_C4 may be areas in which the image is substantially displayed, however, the inventive concepts should not be limited thereto or thereby. That is, as an example, the first to fourth corner display areas DA2_C1 to DA2_C4 may be areas in which no image is displayed, and only a portion of the first to fourth corner display areas DA2_C1 to DA2_C4 may display the image.

The display panel DP may include pixels disposed in the first display area DA1 and pixels disposed in the second display area DA2. In this case, the pixels disposed in the first display area DA1 will be referred to as first pixels, and the pixels disposed in the second display area DA2 will be referred to as second pixels. Each of the first pixels may include a first emission element and a first pixel driving circuit connected to the first emission element, and each of the second pixels may include a second emission element and a second pixel driving circuit connected to the second emission element.

Referring to FIG. 2B, the display device DD further includes a controller 100, a gate driver 200, a data driver 300, a driving voltage generator 400, and an initialization voltage generator 500.

The controller 100 receives image data I_DATA and an input control signal I_CS and converts a data format of the image data I_DATA to a data format appropriate to an interface between the controller 100 and the data driver 300 to generate an image signal IS. The controller 100 converts the input control signal I_CS into various control signals DCS, GCS, and VCS and outputs the control signals DCS, GCS, and VCS.

The gate driver 200 receives a gate control signal GCS from the controller 100. The gate control signal GCS includes a vertical start signal that starts an operation of the gate driver 200 and a clock signal that determines an output timing of signals. The gate driver 200 generates a plurality of scan signals and sequentially outputs the scan signals to a plurality of scan lines GIL1 to GILn, GWL1 to GWLn, and GBL1 to GBLn that are describe below. In addition, the gate driver 200 generates a plurality of emission control signals in response to the gate control signal GCS and outputs the emission control signals to a plurality of emission control lines EL1 to ELn that are described below.

FIG. 2B illustrates a structure in which the scan signals and the emission control signals are output from one gate driver 200, however, the inventive concepts should not be limited thereto or thereby. As an example, a scan driving circuit that generates and outputs a plurality of scan signals and an emission driving circuit that generates and outputs a plurality of emission control signals may be provided separately from each other. In addition, the gate driver 200 may include first and second gate drivers GDC1 and GDC2 illustrated in FIG. 2C. The first and second gate drivers GDC1 and GDC2 may be electrically connected to opposite ends of each of the scan lines GIL1 to GILn, GWL1 to GWLn, and GBL1 to GBLn.

The data driver 300 receives a data control signal DCS and the image signal IS from the controller 100. The data driver 300 converts the image signal IS to a data signal and outputs the data signal to a plurality of data lines DL1 to DLm described below. The data signal may be an analog voltage corresponding to a grayscale value of the image signal IS.

The driving voltage generator 400 receives a power source voltage Vin from a power supply (not illustrated). The driving voltage generator 400 converts the power source voltage Vin to generate a first driving voltage ELVDD and a second driving voltage ELVSS having a voltage level different from that of the first driving voltage ELVDD. The driving voltage generator 400 may include a DC-DC converter. The driving voltage generator 400 may include a boosting converter that boosts the power source voltage Vin and generates the first driving voltage ELVDD. In addition, the driving voltage generator 400 may include a buck converter that steps down the power source voltage Vin and generates the second driving voltage ELVSS. The driving voltage generator 400 receives a driving voltage control signal VCS from the controller 100. The driving voltage generator 400 generates the first and second driving voltages ELVDD and ELVSS in response to the driving voltage control signal VCS.

The initialization voltage generator 500 receives the first and second driving voltages ELVDD and ELVSS from the driving voltage generator 400. The initialization voltage generator 500 generates an initialization voltage Vint using the first and second driving voltages ELVDD and ELVSS. The initialization voltage Vint has a voltage level different from those of the first and second driving voltages ELVDD and ELVSS.

The display panel DP includes the scan lines GIL1 to GILn, GWL1 to GWLn, and GBL1 to GBLn, the emission control lines EL1 to ELn, the data lines DL1 to DLm, and the pixels PX. The scan lines GIL1 to GILn, GWL1 to GWLn, and GBL1 to GBLn extend in the first direction DR1 and are arranged in the second direction DR2 perpendicular to the first direction DR1. Each of the emission control lines EL1 to ELn is arranged parallel to a corresponding scan line among the scan lines GIL1 to GILn, GWL1 to GWLn, and GBL1 to GBLn. The data lines DL1 to DLm are insulated from the scan lines GIL1 to GILn, GWL1 to GWLn, and GBL1 to GBLn while crossing the scan lines GIL1 to GILn, GWL1 to GWLn, and GBL1 to GBLn.

Each of the pixels PX is connected to a corresponding scan line among the scan lines GIL1 to GILn, GWL1 to GWLn, and GBL1 to GBLn, a corresponding emission line among the emission control lines EL1 to ELn, and corresponding data lines among the data lines DL1 to DLm. FIG. 2B illustrates a structure in which each of the pixels PX is connected to three scan lines among the scan lines GIL1 to GILn, GWL1 to GWLn, and GBL1 to GBLn, however, the inventive concepts should not be limited thereto or thereby. For example, each pixel PX may be connected to two scan lines among the scan lines GIL1 to GILn, GWL1 to GWLn, and GBL1 to GBLn.

The display panel DP receives the first driving voltage ELVDD and the second driving voltage ELVSS. The first driving voltage ELVDD is applied to the pixels PX via a first power line. The second driving voltage ELVSS is applied to the pixels PX via electrodes (not illustrated) formed in the display panel DP or a second power line. The display panel DP receives the initialization voltage Vint. The initialization voltage Vint may be applied to the pixels PX via an initialization voltage line VIL.

The display panel DP illustrated in FIG. 2B may include the first and second display areas DA1 and DA2 as illustrated in FIG. 2C, and the pixels PX may include the first pixels disposed in the first display area DA1 and the second pixels disposed in the second display area DA2.

The gate driver 200 may include the first gate driver GDC1 and the second gate driver GDC2. The first and second gate drivers GDC1 and GDC2 may generate the scan signals and the emission control signals and may output the generated signals to corresponding pixels. The first and second gate drivers GDC1 and GDC2 may be built in the display panel DP. That is, the first and second gate drivers GDC1 and GDC2 may be directly formed in the display panel DP through a thin film process of forming the pixels PX in the display panel DP.

The display panel DP may further include a non-display area around the second display area DA2. The non-display area may be an area in which the image is not displayed. The non-display area may surround the second display area DA2.

Each of the first and second gate drivers GDC1 and GDC2 may be disposed in the second display area DA2 or may be disposed to partially overlap the second display area DA2 that includes second pixels PX2. As each of the first and second gate drivers GDC1 and GDC2 is disposed in the second display area DA2, an increase in width of the non-display area due to the first and second gate drivers GDC1 and GDC2 may be prevented. Consequently, the size of the non-display area of the display device DD, which is perceived by the user, may be reduced by the second display area DA2.

In FIG. 2C, the first gate driver GDC1 is disposed adjacent to an outer side of the third edge display area DA2_E3, and the second gate driver GDC2 is disposed adjacent to an outer side of the fourth edge display area DA2_E4. In addition, the first gate driver GDC1 is disposed adjacent to outer sides of the first and third corner display areas DA2_C1 and DA2_C3, and the second gate driver GDC2 is disposed adjacent to outer sides of the second and fourth corner display areas DA2_C2 and DA2_C4. However, locations of the first and second gate drivers GDC1 and GDC2 should not be limited thereto or thereby.

As illustrated in FIG. 2D, the first gate driver GDC1 is disposed adjacent to a boundary of the first display area DA1 in the first and third corner areas DA2_C1 and DA2_C3, and the second gate driver GDC2 is disposed adjacent to a boundary of the first display area DA1 in the second and fourth corner display areas DA2_C2 and DA2_C4. In the first to fourth corner display areas DA2_C1 to DA2_C4, a bending stress may increase closer to the outside with respect to the first display area DA1. When the first and second gate drivers GDC1 and GDC2 are disposed adjacent to the outer side in the first to fourth corner display areas DA2_C1 to DA2_C4, the bending stress may affect an operation of the first and second gate drivers GDC1 and GDC2. Accordingly, as the first and second gate drivers GDC1 and GDC2 are disposed adjacent to the first display area DA1 in the first to fourth corner display areas DA2_C1 to DA2_C4, a deterioration in reliability of the first and second gate drivers GDC1 and GDC2, which is caused by the bending stress, may be prevented.

In an embodiment of the inventive concepts, the first image displayed in the first display area DA1 and the second image displayed in the second display area DA2 may be dependent on each other. As an example, a picture, a scene in a movie, or a UX/UI design may be formed by the combination of the first image and the second image, however, the inventive concepts should not be limited thereto or thereby. For example, a portion of the second display area DA2, e.g., the first to fourth corner display areas DA2_C1 to DA2_C4, may display a black image or an image having a certain pattern, which is not dependent on the first image.

As an example, the display panel DP may be an organic light emitting display panel, an electrophoretic display panel, or an electrowetting display panel. In addition, the display panel DP may be a flexible display panel that is bent along a shape of the window WM.

Referring to FIG. 2A again, the display panel DP may further include a pad area PP extending from the second display area DA2. A driving chip D-IC and pads may be disposed in the pad area PP of the display panel DP. The driving chip D-IC may include the data driver 300 (refer to FIG. 2B). The driving chip D-IC in which the data driver 300 is built may apply the data signal to the first and second display areas DA1 and DA2 of the display panel DP. The driving chip D-IC may further include the driving voltage generator 400 and the initialization voltage generator 500. In this case, the driving chip D-IC may supply the first and second driving voltages ELVDD and ELVSS and the initialization voltage Vint to the first and second display areas DA1 and DA2.

As an example, the driving chip D-IC may be mounted on the display panel DP. The display panel DP may be electrically connected to a flexible circuit film FCB via the pads. According to an embodiment of the inventive concepts, the driving chip D-IC may be mounted on the flexible circuit film FCB.

The housing HU may include a bottom portion BP and a sidewall SW. The sidewall SW may extend from the bottom portion BP. The display panel DP may be accommodated in an accommodating space defined by the bottom portion BP and the sidewall SW in the housing HU. The window WM may be coupled to the sidewall SW of the housing HU. The sidewall SW of the housing HU may support an edge of the window WM.

The housing HU may include a material having a relatively high strength. For example, the housing HU may include a glass, plastic, or metal material or a plurality of frames and/or plates formed by a combination of the glass, plastic, and metal materials. The housing HU may stably protect components of the display device DD accommodated therein from external impacts.

Figure 3A:
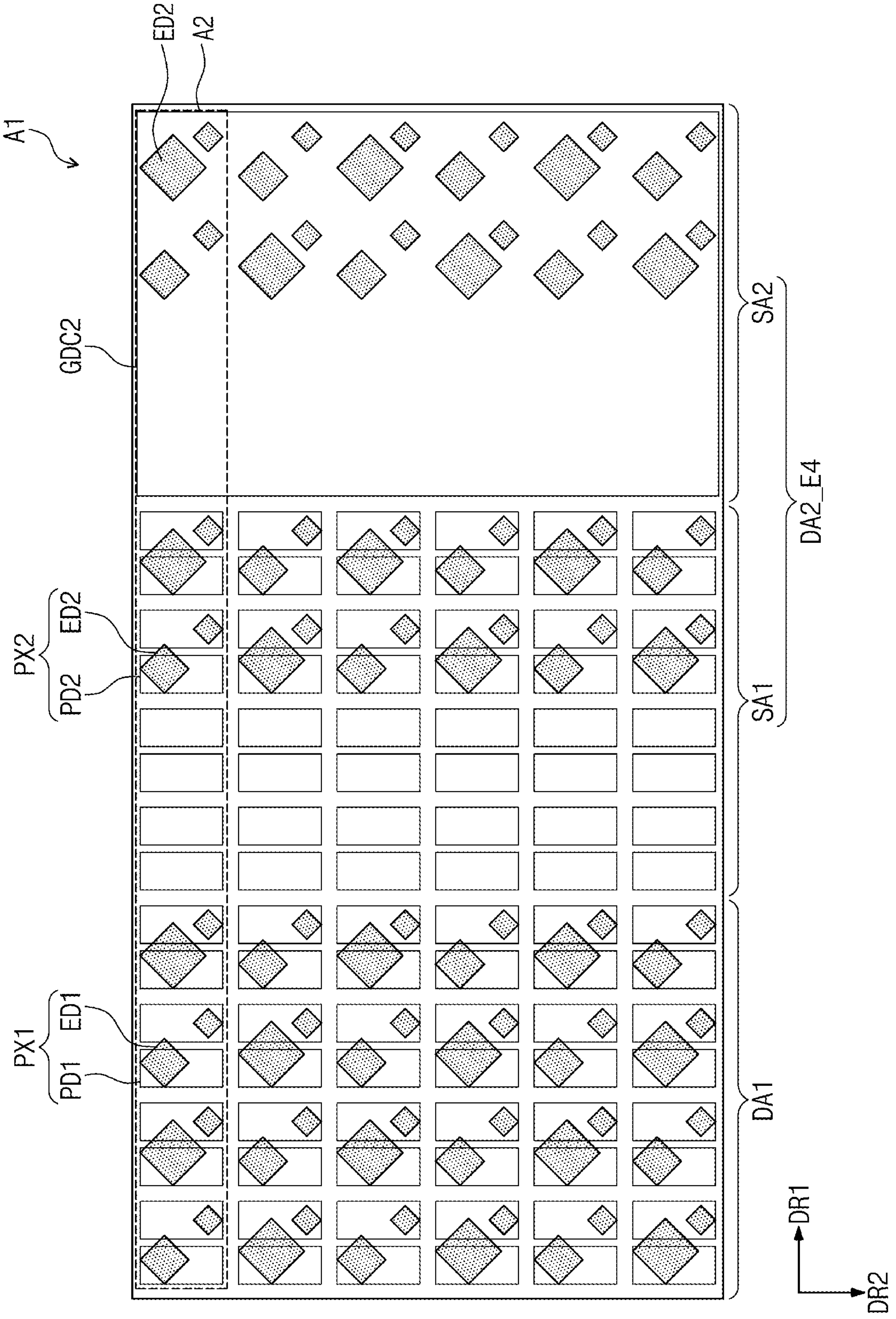
FIG. 3A is an enlarged plan view illustrating an area A1 shown in FIG. 2C according to an embodiment of the inventive concepts.
Figure 3B:
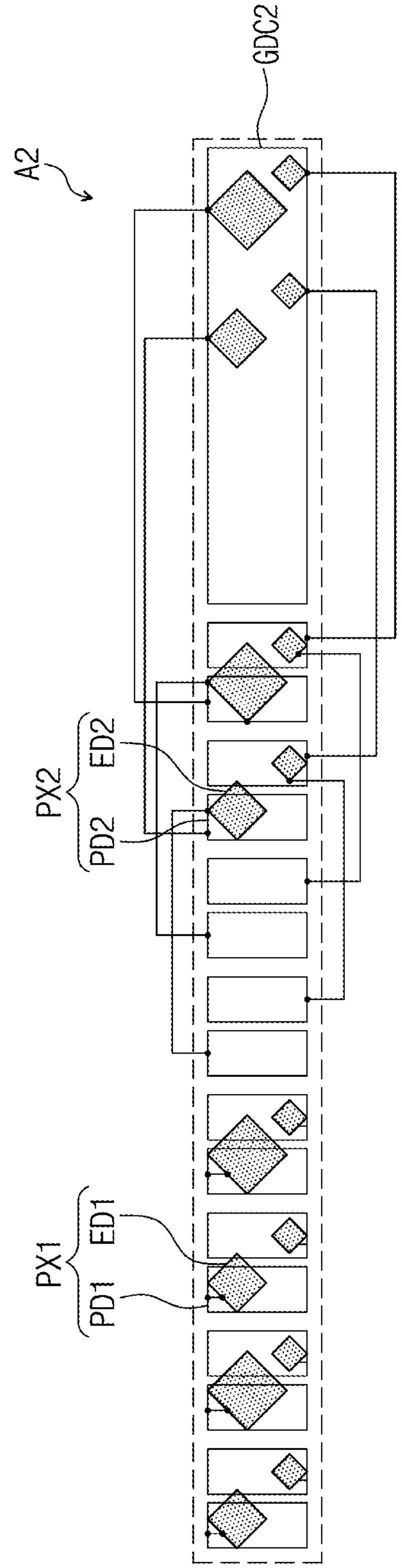
FIG. 3B is a view illustrating a connection relation between emission elements and pixel driving circuits of an area A2 shown in FIG. 3A.
Figure 3C:
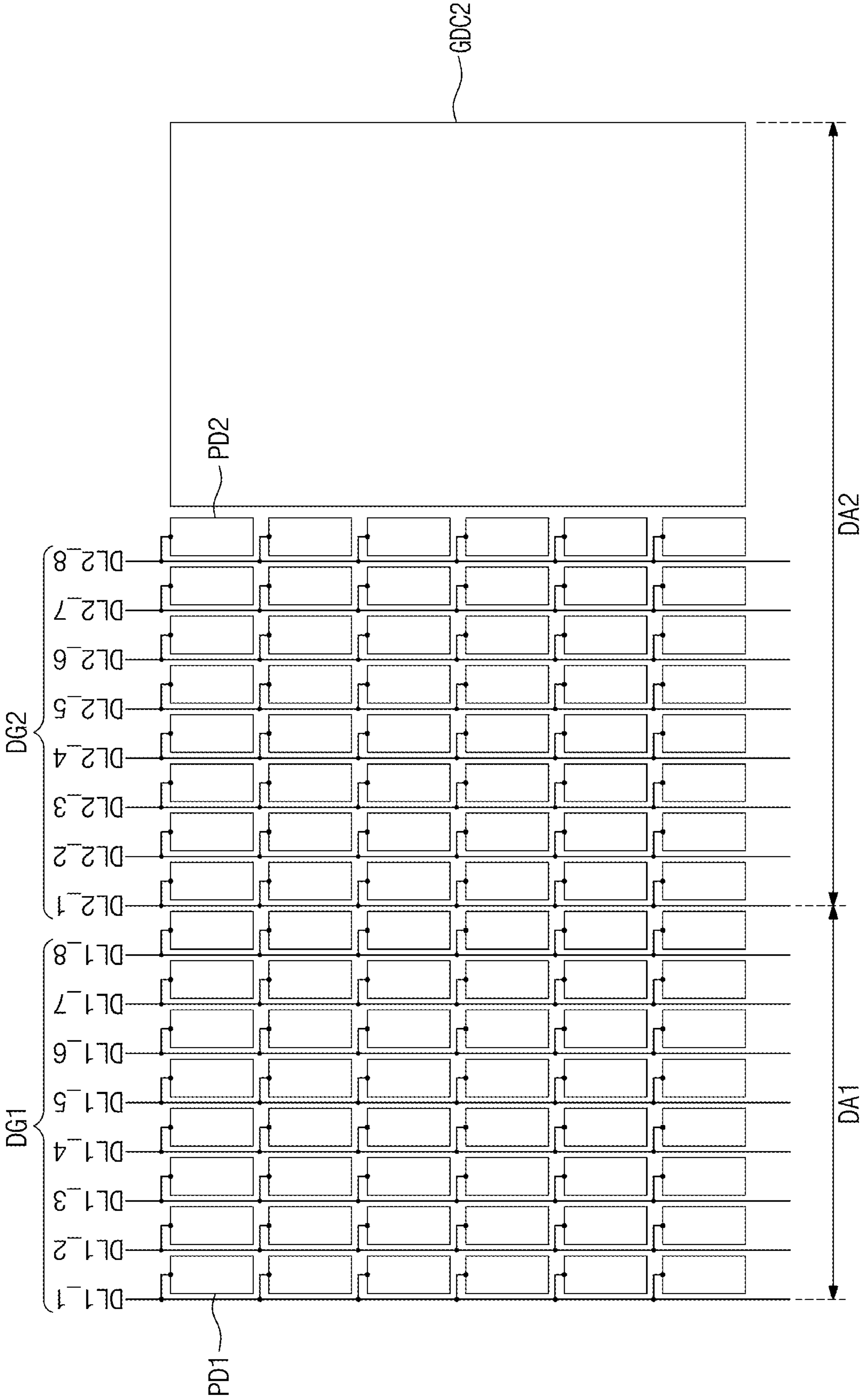
FIG. 3C is a view illustrating a connection relation between pixel driving circuits shown in FIG. 3A and data lines.
Figure 3D:
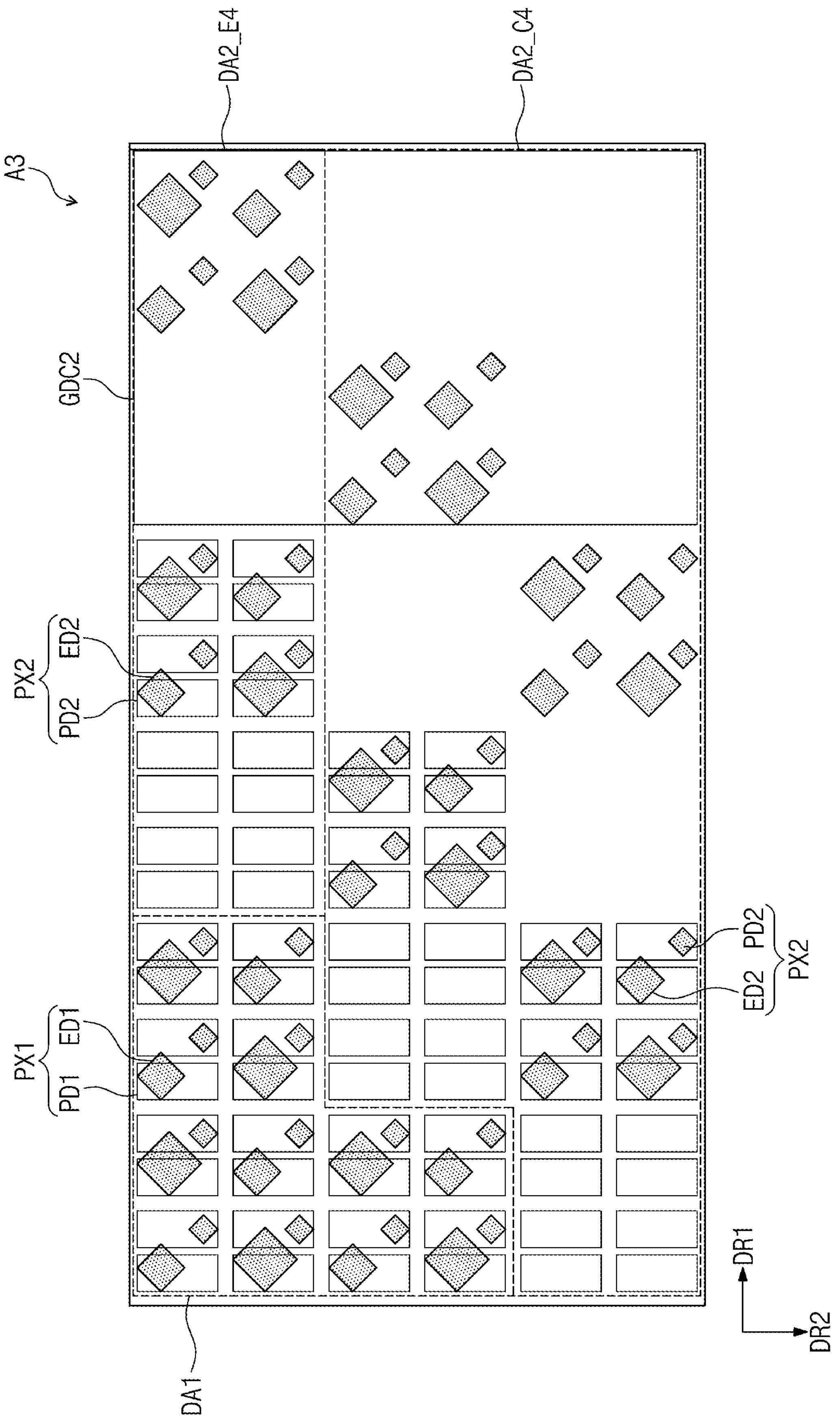
FIG. 3D is an enlarged plan view illustrating an area A3 shown in FIG. 2C according to an embodiment of the inventive concepts.
Figure 3E:
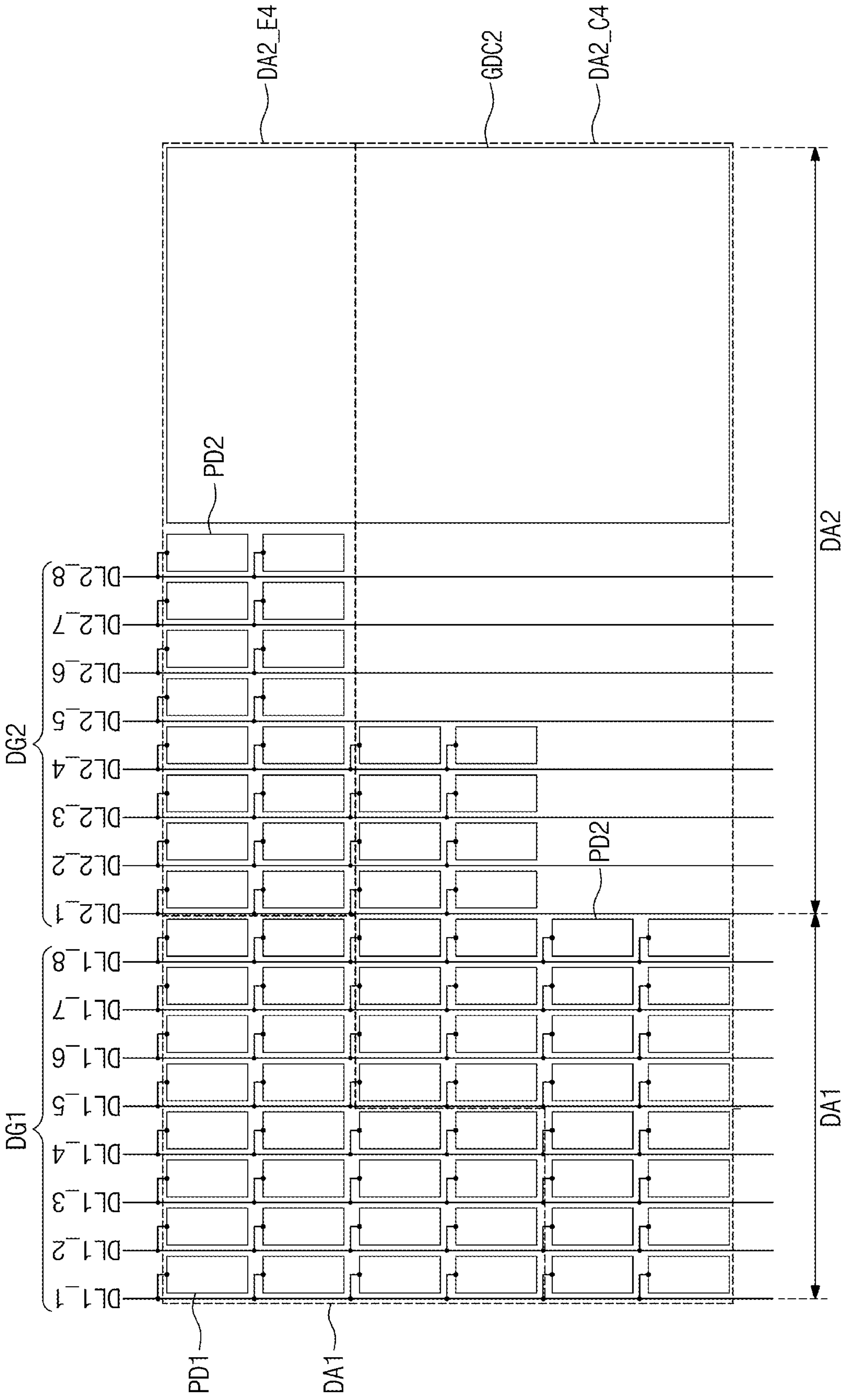
FIG. 3E is a view illustrating a connection relation between pixel driving circuits shown in FIG. 3D and data lines.

FIG. 3A is an enlarged plan view illustrating an area A1 shown in FIG. 2C according to an embodiment of the inventive concepts, and FIG. 3B is a view illustrating a connection relation between the emission elements and the pixel driving circuits of an area A2 shown in FIG. 3A. FIG. 3C is a view illustrating a connection relation between pixel driving circuits shown in FIG. 3A and data lines. FIG. 3D is an enlarged plan view illustrating an area A3 shown in FIG. 2C according to an embodiment of the inventive concepts, and FIG. 3E is a view illustrating a connection relation between pixel driving circuits shown in FIG. 3D and data lines.

Referring to FIGS. 3A and 3B, the first pixels PX1 may be disposed in the first display area DA1 of the display panel DP. The first pixels PX1 may include a plurality of first red pixels, a plurality of first green pixels, and a plurality of first blue pixels. Each of the first pixels PX1 may include a first pixel driving circuit PD1 and a first emission element ED1. A rectangular section may represent the pixel driving circuit PD1, and the shaded color portions represent the color emission areas. The first pixel driving circuit PD1 may be electrically connected to a corresponding first emission element ED1 and may control a drive of the first emission element ED1. In the first display area DA1, the first pixel driving circuit PD1 may be disposed to overlap the first emission element ED1 electrically connected thereto.

The fourth edge display area DA2_E4 of the second display area DA2 may include first and second sub-areas SA1 and SA2. FIGS. 3A to 3C show only the fourth edge display area DA2_E4 of the second display area DA2, however, the first to third edge display areas DA2_E1 to DA2_E3 and the first to fourth corner display areas DA2_C1 to DA2_C4 of the second display area DA2 may have a structure similar to that of the fourth edge display area DA2_E4. Accordingly, the fourth edge display area DA2_E4 will be described with reference to FIGS. 3A to 3C, and descriptions of the other areas of the second display area DA2 will be omitted. However, hereinafter, for the convenience of explanation, the fourth edge display area DA2_E4 will be referred to as the second display area DA2, which is an upper concept including the fourth edge display area DA2_E4.

The second pixels PX2 may be disposed in the second display area DA2 of the display panel DP. The second pixels PX2 may include a plurality of second red pixels, a plurality of second green pixels, and a plurality of second blue pixels. Each of the second pixels PX2 may include a second pixel driving circuit PD2 and a second emission element ED2. The second pixel driving circuit PD2 may be electrically connected to a corresponding second emission element ED2 and may control a drive of the second emission element ED2. In the second display area DA2, the second pixel driving circuit PD2 may be disposed not to overlap the second emission element ED2 electrically connected thereto.

The second display area DA2 may include the first sub-area SA1 and the second sub-area SA2. In detail, the fourth edge display area DA2_E4 of the second display area DA2 may be divided into the first sub-area SA1 and the second sub-area SA2. The third edge display area DA2_E3 of the second display area DA2 may also be divided into the first sub-area SA1 and the second sub-area SA2.

The second pixel driving circuits PD2 of the second pixels PX2 may be disposed in the first sub-area SA1, and the second emission elements ED2 of the second pixels PX2 may be disposed in the first and second sub-areas SA1 and SA2. The second pixel driving circuits PD2 of the second pixels PX2 may be disposed in the first sub-area SA1, and the second gate driver GDC2 or the first gate driver GDC1 (refer to FIG. 2C) may be disposed in the second sub-area SA2. Accordingly, the second pixel driving circuits PD2 may not overlap the second gate driver GDC2 or the first gate driver GDC1.

Some of the second emission elements ED2 of the second pixels PX2 are disposed in the first sub-area SA1, and the other of the second emission elements ED2 of the second pixels PX2 are disposed in the second sub-area SA2. Hereinafter, the second emission elements ED2 disposed in the first sub-area SA1 are referred to as a first group of the second emission elements ED2, and the second emission elements ED2 disposed in the second sub-area SA2 are referred to as a second group of the second emission elements ED2. The first group of the second emission elements ED2 is disposed on the second pixel driving circuits PD2 in the first sub-area SA1, and the second group of the second emission elements ED2 is disposed on the second gate driver GDC2 or the first gate driver GDC1 in the second sub-area SA2. Accordingly, each of the second emission elements ED2 of the second group in the second sub-area SA2 may not overlap the corresponding second pixel driving circuit PD2 electrically connected thereto.

As illustrated in FIGS. 3A and 3B, when the first emission element ED1 is compared with the second emission element ED2 emitting the same color as that of the first emission element ED1, the first and second emission elements ED1 and ED2 may have the same size and shape. However, the number of the second pixels PX2 arranged per unit area in the second display area DA2 may be equal to or smaller than the number of the first pixels PX1 arranged per unit area in the first display area DA1. In this case, the term "unit area" may correspond to a size enough to cover at least four first pixels PX1. As an example, FIG. 3A illustrates a structure in which the number of the second pixels PX2 arranged per unit area in the second display area DA2 is reduced to a half (½) of the number of the first pixels PX1 arranged per unit area in the first display area DA1, however, the inventive concepts should not be limited thereto or thereby. As an example, the number of the second pixels PX2 arranged per unit area in the second display area DA2 may be reduced to one fourth (¼) or one eighth (⅛) of the number of the first pixels PX1 arranged per unit area in the first display area DA1. In this case, the term "unit area" may correspond to a size enough to cover at least eighth or sixteen pixels. In that regard, a portion of the first sub area SA1 will remain unoccupied by second emission elements ED2, as will portions of the second sub area SA2.

Referring to FIG. 3C, a first data line group DG1 including data lines DL1_1 to DL1_8 respectively connected to the first pixels PX1 may be disposed in the first display area DA1, and a second data line group DG2 including data lines DL2_1 to DL2_8 respectively connected to the second pixels PX2 may be disposed in the second display area DA2. For the convenience of explanation, FIG. 3C illustrates eight data lines DL1_1 to DL1_8 among the data lines included in the first data line group DG1 and eight data lines DL2_1 to DL2_8 among the data lines included in the second data line group DG2. However, the number of the data lines included in each of the first and second data line groups DG1 and DG2 should not be limited thereto or thereby.

The sixteen data lines DL1_1 to DL1_8 and DL2_1 to DL2_8 illustrated in FIG. 3C are data lines selected from the data lines DL1 to DLm illustrated in FIG. 2B.

The data lines DL1_1 to DL1_8 of the first data line group DG1 may be connected to the first pixel driving circuits PD1, and the data lines DL2_1 to DL2_8 of the second data line group DG2 may be connected to the second pixel driving circuits PD2.

As illustrated in FIGS. 3D and 3E, at least a portion of the data lines DL1_1 to DL1_8 included in the first data line group DG1 may be connected to the second pixel driving circuits PD2. For example, the data lines overlapping to the first and second edge display areas DA2_E1 and DA2_E2 (refer to FIG. 2C) and the first to fourth corner display areas DA2_C1 to DA2_C4 may be connected to the second pixel driving circuits PD2 as well as the first pixel driving circuits PD1.

Figure 4A:
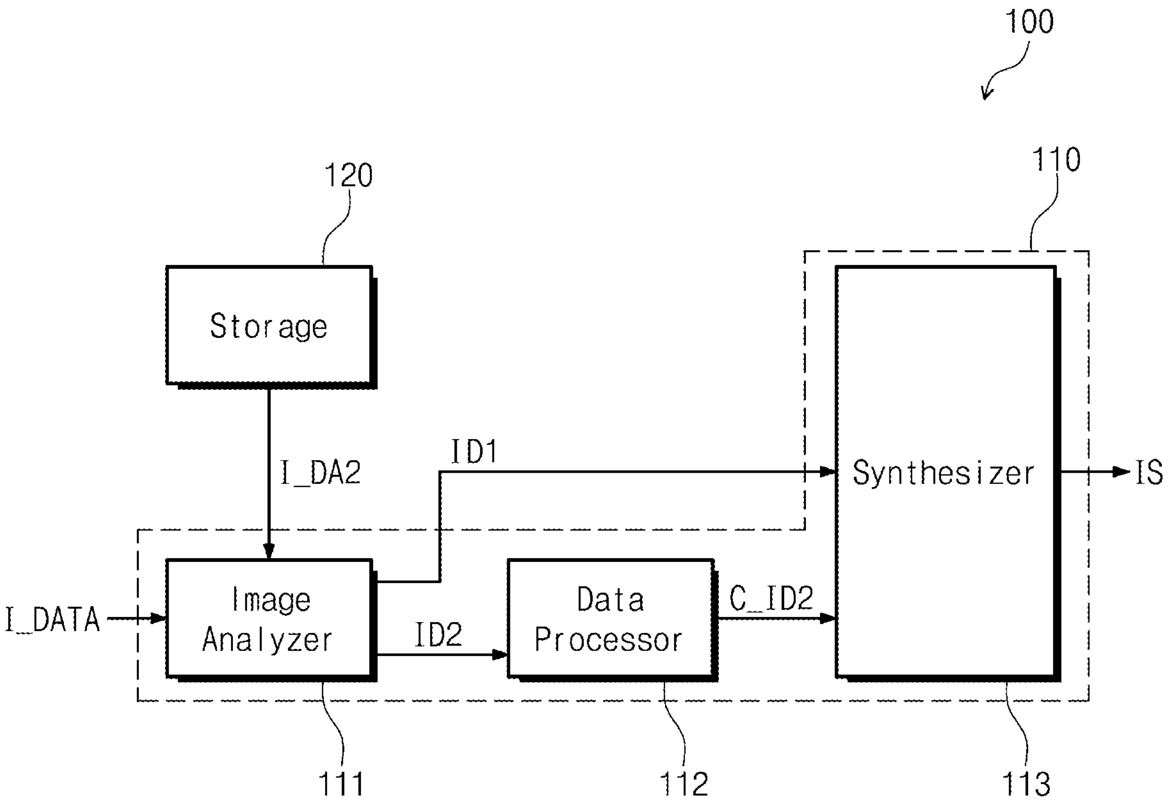
FIG. 4A is an inner block diagram illustrating a controller shown in FIG. 2B.
Figure 4B:
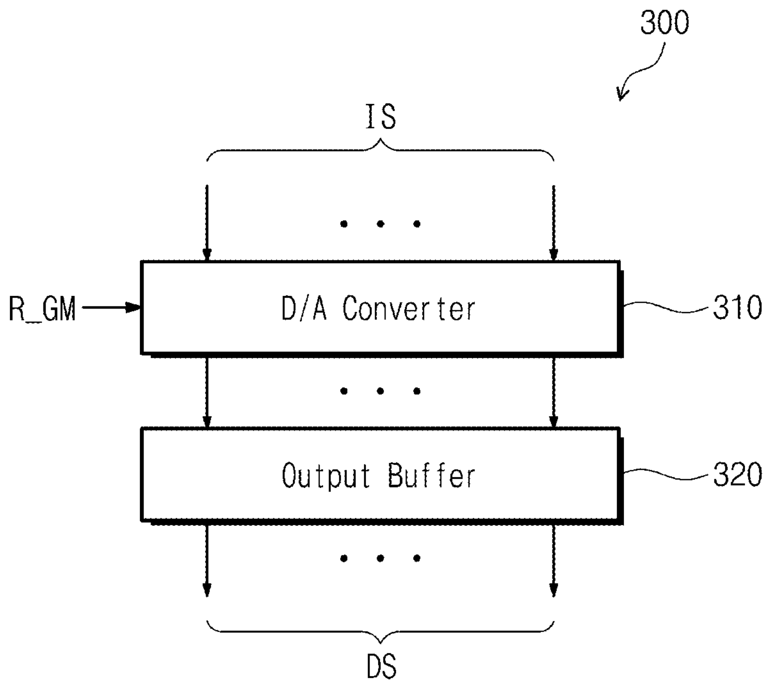
FIG. 4B is an inner block diagram illustrating a data driver shown in FIG. 2B.
Figure 5A:
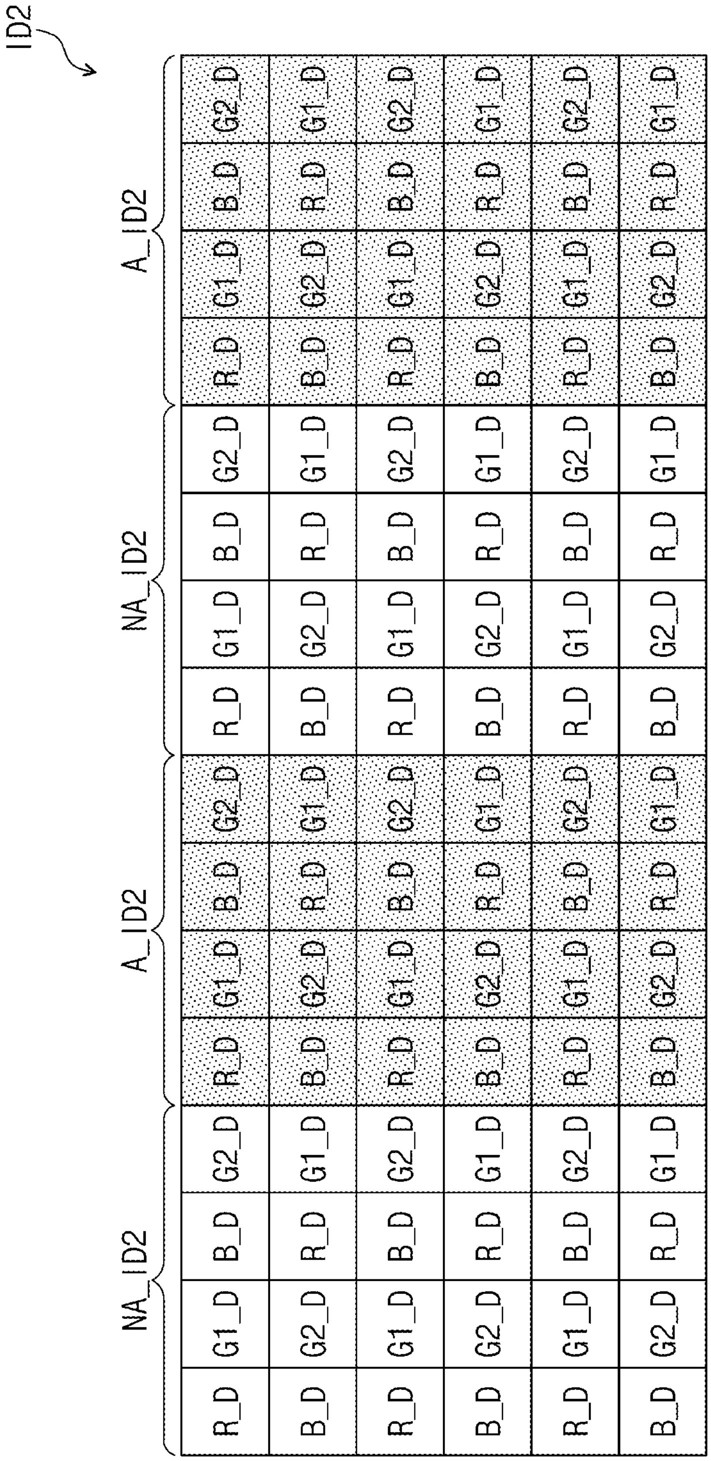
FIGS. 5A to 5C are conceptual views explaining a data compensation method of a data compensator applied to a pixel structure of FIG. 3A.
Figure 5B:
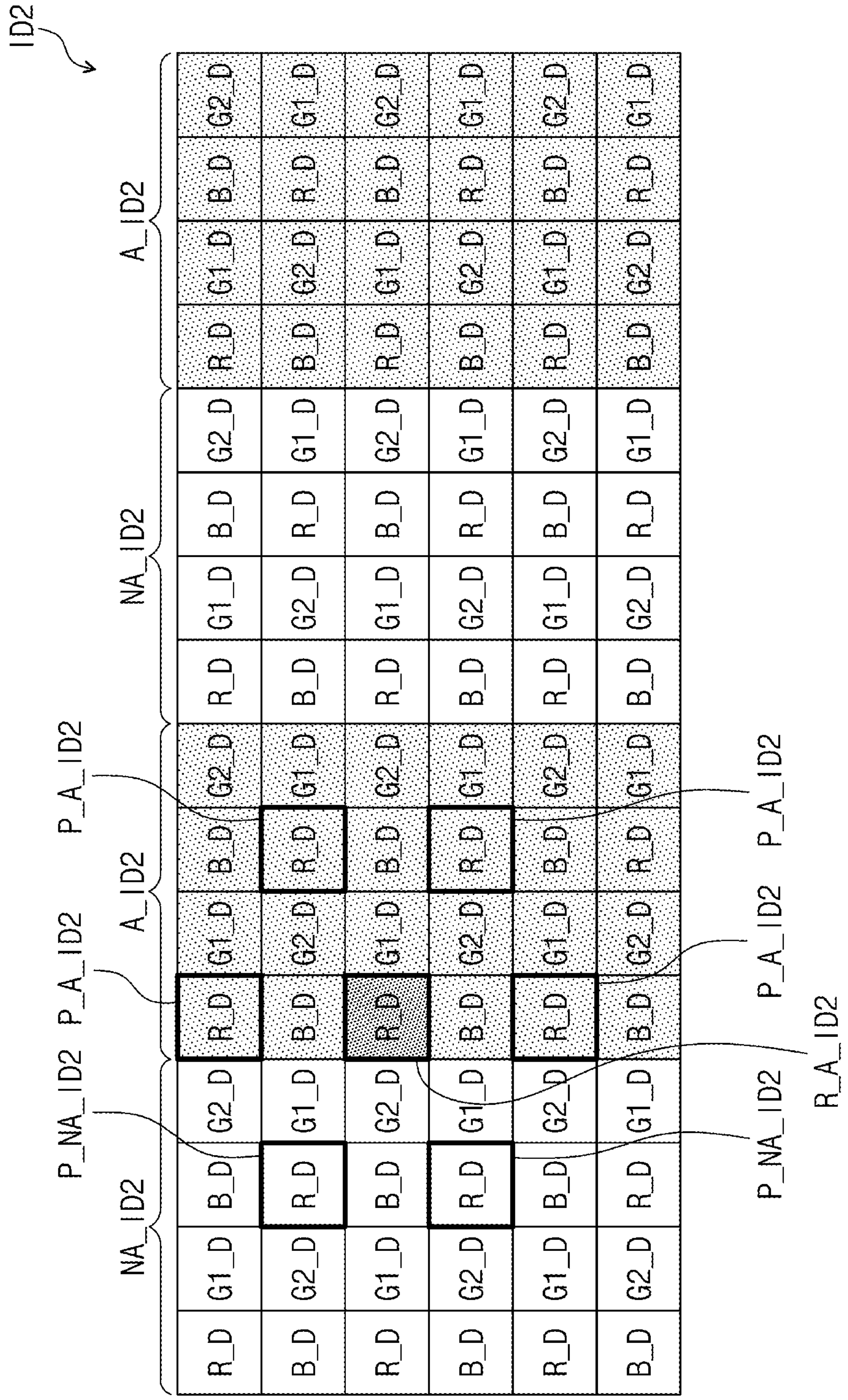
Figure 5C:
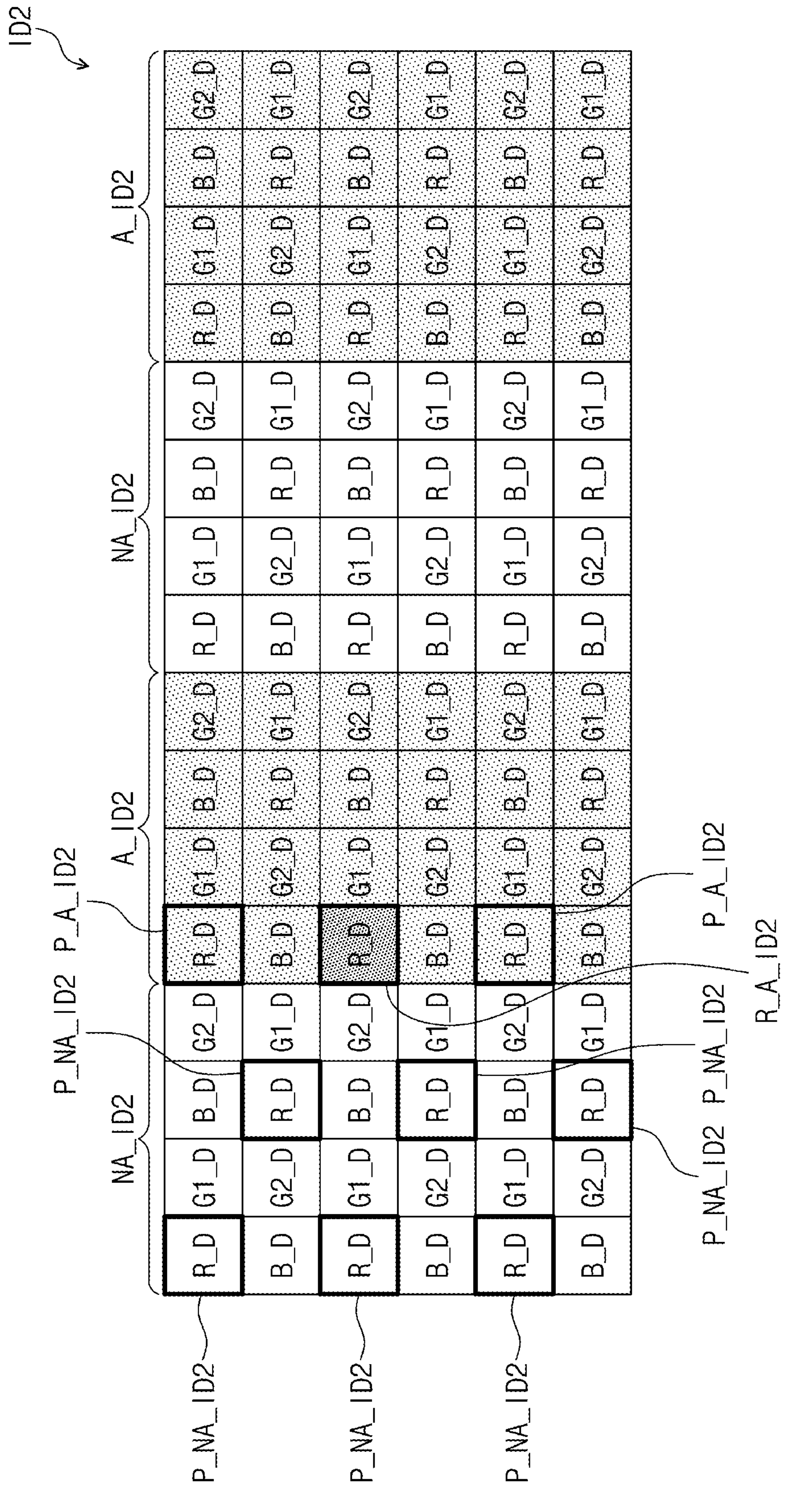

FIG. 4A is an inner block diagram illustrating the controller 100 shown in FIG. 2B, and FIG. 4B is an inner block diagram illustrating the data driver 300 shown in FIG. 2B. FIGS. 5A to 5C are conceptual views explaining a data compensation method of a data compensator 110 applied to a pixel structure of FIG. 3A.

Referring to FIGS. 3A and 4A, the controller 100 may include the data compensator 110 and a storage 120. The data compensator 110 may include an image analyzer 111, a data processor 112, and a synthesizer 113. The storage 120 may store information I_DA2 about the second display area DA2. As an example, the information I_DA2 may include information about the number of the second pixels PX2 arranged in the second display area DA2, a size of each of the second pixels PX2, a width of the second display area DA2, and a position of the second pixels PX2.

The image analyzer 111 may receive image data I_DATA and may divide the image data I_DATA into first image data ID1 corresponding to the first display area DA1 and second image data ID2 corresponding to the second display area DA2 based on the information I_DA2. The data processor 112 may analyze the second image data ID2 and may process the second image data ID2 based on the analyzed result.

As illustrated in FIGS. 4A, 5A, and 5B, the second image data ID2 may include effective data A_ID2 that substantially correspond to the second pixels PX2 and non-effective data NA_ID2 that substantially do not correspond to the second pixels PX2. The non-effective data NA_ID2 are data discarded because the second pixels PX2 corresponding to the non-effective data NA_ID2 do not exist in the display panel DP (refer to FIG. 2A). Each of the effective data A_ID2 and the non-effective data NA_ID2 may include red image data R_D, blue image data B_D, and first and second green image data G1_D and G2_D.

The data processor 112 may compensate for the effective data A_ID2 using the non-effective data NA_ID2 of the second image data ID2 and may output compensation data C_ID2. In detail, the data processor 112 may set reference effective data R_A_ID2 from the effective data A_ID2 and may set peripheral data adjacent to the reference effective data R_A_ID2 from the non-effective data NA_ID2. As illustrated in FIG. 5B, in a case where one of the effective data A_ID2 is set to the reference effective data R_A_ID2, six peripheral data adjacent to the reference effective data R_A_ID2 may be set. The six peripheral data may include two non-effective data P_NA_ID2 and four effective data P_A_ID2. The number of the peripheral data should not be limited thereto or thereby, and the number of the non-effective data P_NA_ID2 and the number of the effective data P_A_ID2, which are included in the peripheral data, should not be particularly limited. As illustrated in FIG. 5C, eight peripheral data adjacent to the reference effective data R_A_ID2 may be set. The eight peripheral data may include six non-effective data P_NA_ID2 and two effective data P_A_ID2. In addition, the number of the non-effective data and the number of the effective data, which are included in the peripheral data, may be changed depending on a position of the second pixel PX2 corresponding to the reference effective data R_A_ID2.

In a case where the reference effective data R_A_ID2 are set to the red image data R_D, the peripheral data may be also set to the red image data R_D. That is, data of pixels having different colors from those of pixels corresponding to the reference effective data R_A_ID2 may not be set to the peripheral data of the reference effective data R_A_ID2.

The data processor 112 may compensate for the reference effective data R_A_ID2 based on the peripheral data to generate the compensation data C_ID2. In addition, the data processor 112 may set each of the effective data A_ID2 to the reference effective data R_A_ID2 to perform a compensation operation on each of the effective data A_ID2. The compensation data C_ID2 generated by compensating for the effective data A_ID2 may be provided to the synthesizer 113.

The synthesizer 113 may synthesize the first image data ID1 and the compensation data C_ID2 and may generate the image signal IS. The image signal IS may be output from the controller 100 and may be provided to the data driver 300.

When one of the blue image data B_D and the first and second green image data G1_D and G2_D are set to the reference effective data R_A_ID2, the above-mentioned compensation process may be performed in the same way. However, the number of the effective data and the number of the non-effective data included in the peripheral data may be different from each other depending on the color of the pixel corresponding to the reference effective data R_A_ID2.

As illustrated in FIG. 4B, the data driver 300 may include a D/A converter 310 and an output buffer 320. The D/A converter 310 may receive the image signal IS and may convert the image signal IS to a data signal DS in an analog form. The D/A converter 310 may receive a reference gamma voltage R_GM from an external source (not illustrated). The D/A converter 310 may generate the data signal DS corresponding to the image signal IS in a digital form based on the reference gamma voltage R_GM.

The data signal DS generated by the D/A converter 310 may be provided to the output buffer 320. The output buffer 320 may be connected to the data lines DL1 to DLm (refer to FIG. 2B) and may provide the data signal DS to the data lines DL1 to DLm. The output buffer 320 may control an output timing of the data signal DS provided to the data lines DL1 to DLm.

According to FIGS. 4A to 5C, as the data compensator 110 compensates for the effective data A_ID2 substantially provided to the second pixels PX2 using the non-effective data NA_ID2 discarded between the first pixels PX1 and the second pixels PX2, a phenomenon in which a boundary between the first display area DA1 and the second display area DA2 is viewed may be prevented or may decrease.

Figure 6A:
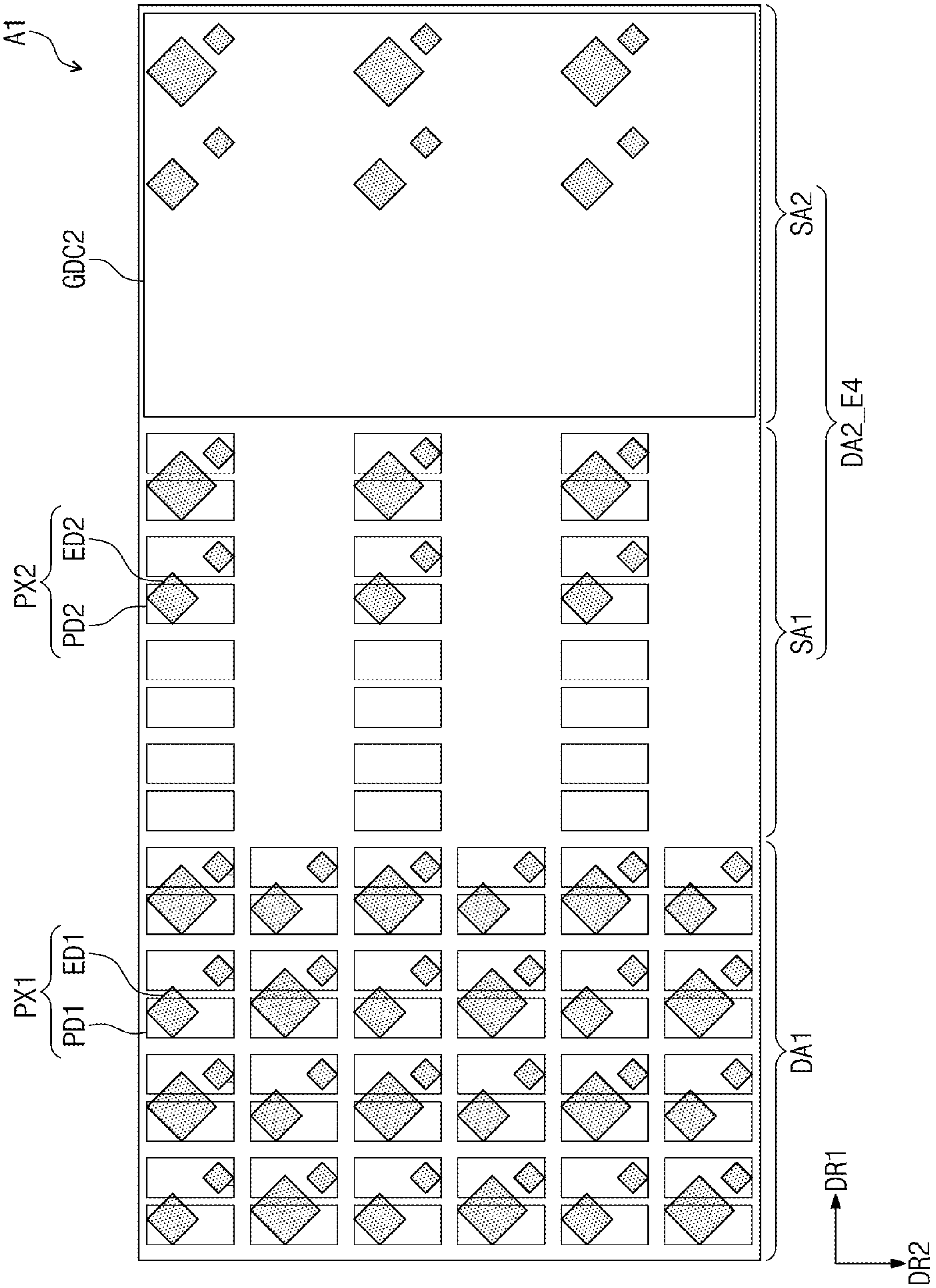
FIG. 6A is an enlarged plan view illustrating an area A1 shown in FIG. 2C according to an embodiment of the inventive concepts.
Figure 6B:
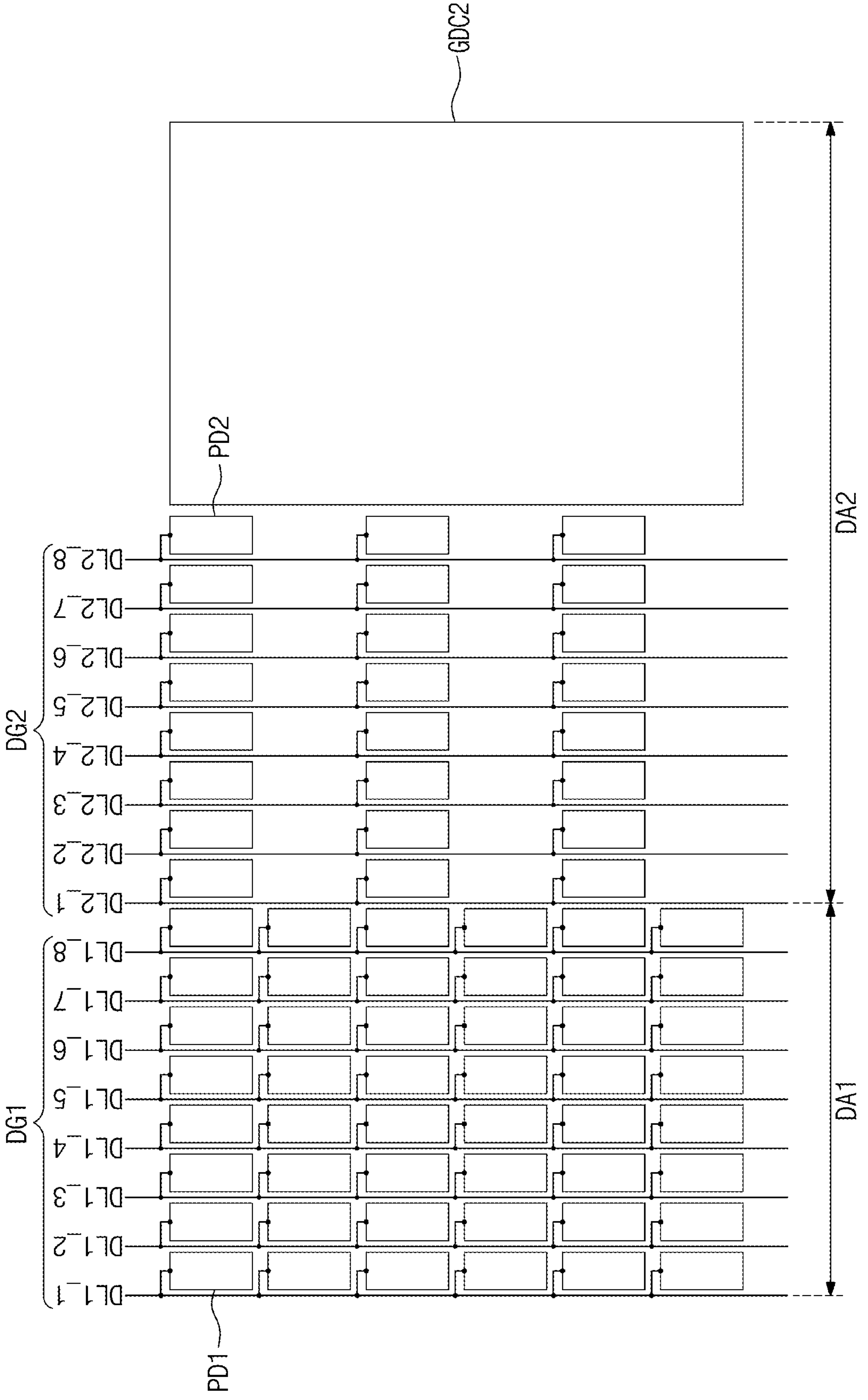
FIG. 6B is a view illustrating a connection relation between pixel driving circuits shown in FIG. 6A and data lines.
Figure 7A:
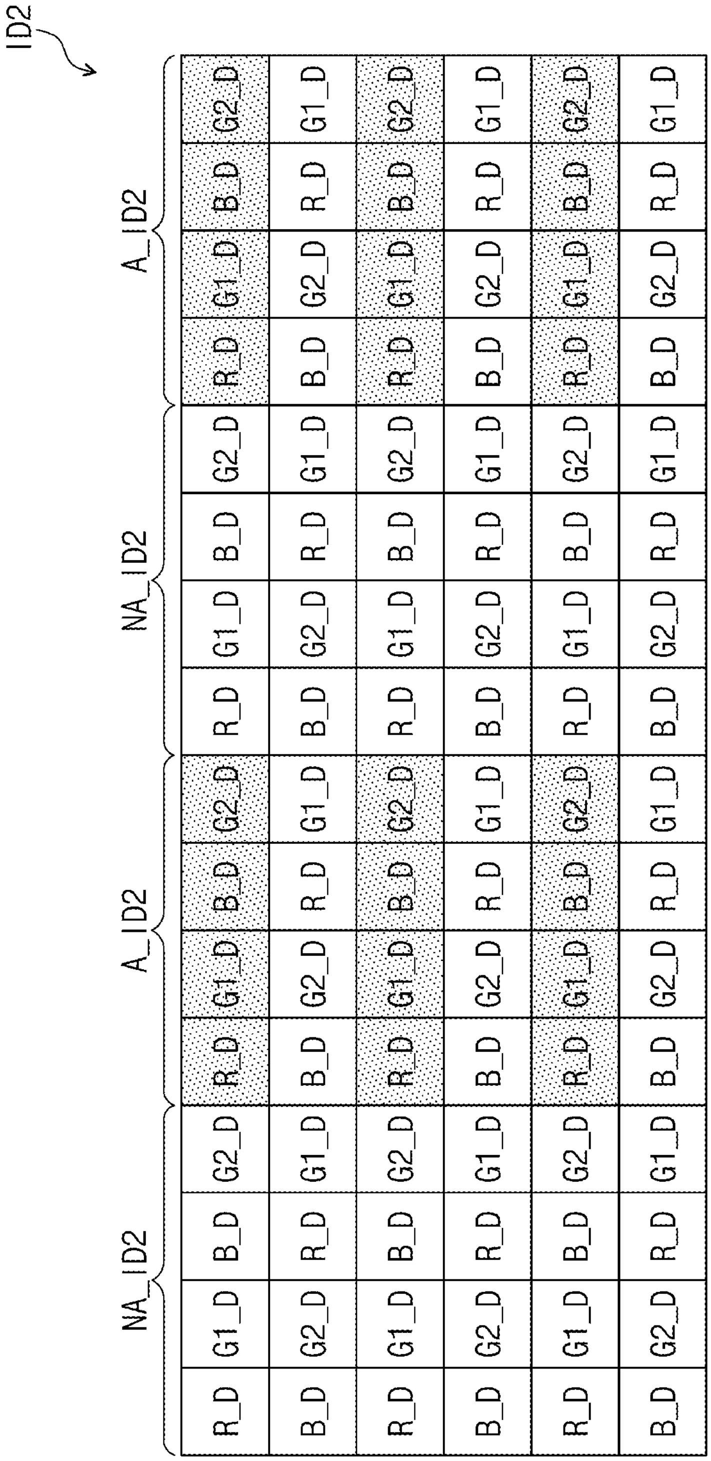
FIGS. 7A and 7B are conceptual views explaining a data compensation method of a data compensator applied to a pixel structure of FIG. 6A.
Figure 7B:
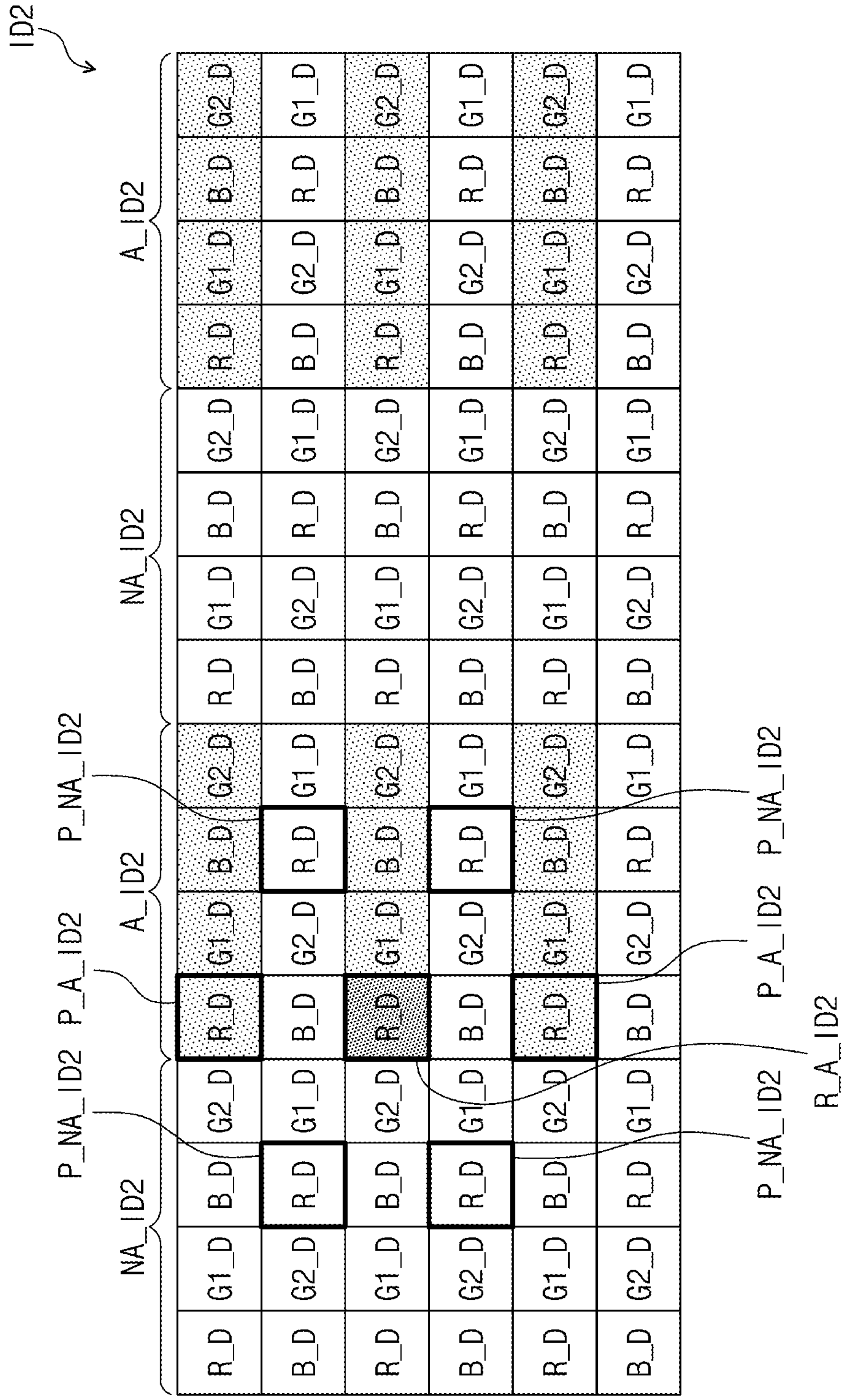

FIG. 6A is an enlarged plan view illustrating an area A1 shown in FIG. 2C according to an embodiment of the inventive concepts, and FIG. 6B is a view illustrating a connection relation between pixel driving circuits shown in FIG. 6A and data lines. FIGS. 7A and 7B are conceptual views explaining a data compensation method of a data compensator applied to the pixel structure of FIG. 6A.

Referring to FIG. 6A, the structure in which the number of the second pixels PX2 arranged per unit area in the second display area DA2 is reduced to one fourth (1/4) of the number of the first pixels PX1 arranged per unit area in the first display area DA1 is illustrated, however, the inventive concepts should not be limited thereto or thereby. For example, the number of the second pixels PX2 arranged per unit area in the second display area DA2 may be reduced to one eight (1/8) or one sixteenth (1/16) of the number of the first pixels PX1 arranged per unit area in the first display area DA1. In this case, the term "unit area" may correspond to a size enough to cover at least eight or sixteen first pixels PX1.

However, when the first emission element ED1 is compared with the second emission element ED2 emitting the same color as that of the first emission element ED1, the first and second emission elements ED1 and ED2 may have the same size and shape.

Referring to FIG. 6B, a first data line group DG1 including data lines DL1_1 to DL1_8 respectively connected to the first pixels PX1 may be disposed in the first display area DA1, and a second data line group DG2 including data lines DL2_1 to DL2_8 respectively connected to the second pixels PX2 may be disposed in the second display area DA2. For the convenience of explanation, FIG. 6B illustrates eight data lines DL1_1 to DL1_8 among the data lines included in the first data line group DG1 and eight data lines DL2_1 to DL2_8 among the data lines included in the second data line group DG2. However, the number of the data lines included in each of the first and second data line groups DG1 and DG2 should not be limited thereto or thereby.

The sixteen data lines DL1_1 to DL1_8 and DL2_1 to DL2_8 illustrated in FIG. 6B are data lines selected from the data lines DL1 to DLm shown in FIG. 2B.

The data lines DL1_1 to DL1_8 of the first data line group DG1 may be connected to the first pixel driving circuits PD1, and the data lines DL2_1 to DL2_8 of the second data line group DG2 may be connected to the second pixel driving circuits PD2. The number of the first pixel driving circuits PD1 respectively connected to the data lines of the first data line group DG1 may be equal to or greater than the number of the second pixel driving circuits PD2 respectively connected to the data lines DL2_1 to DL2_8 of the second data line group DG2. Based on the number of driving circuits connected to one data line, the number of the second pixel driving circuits PD2 may be 1/2 times smaller than the number of the first pixel driving circuits PD1.

Referring to FIGS. 4A, 7A, and 7B, the second image data ID2 may include effective data A_ID2 that substantially correspond to the second pixels PX2 and non-effective data NA_ID2 that substantially do not correspond to the second pixels PX2. The non-effective data NA_ID2 are data discarded because the second pixels PX2 corresponding to the non-effective data NA_ID2 do not exist in the display panel DP (refer to FIG. 2A). When comparing FIG. 7A with FIG. 5A, in a case where the number of the second pixels PX2 arranged in the second display area DA2 decreases, the number of the discarded non-effective data NA_ID2 may increase. As the number of the non-effective data NA_ID2 increases, the phenomenon in which the boundary between the first and second display areas DA1 and DA2 is viewed may be intensified.

The data processor 112 may compensate for the effective data A_ID2 using the non-effective data NA_ID2 of the second image data ID2 and may output compensation data C_ID2. In detail, the data processor 112 may set reference effective data R_A_ID2 from the effective data A_ID2 and may set peripheral data adjacent to the reference effective data R_A_ID2. The peripheral data may include at least one non-effective data NA_ID2. As illustrated in FIG. 7B, in a case where one of the effective data A_ID2 is set to the reference effective data R_A_ID2, six peripheral data adjacent to the reference effective data R_A_ID2 may be set. The six peripheral data may include four non-effective data P_NA_ID2 and two effective data P_A_ID2. The number of the peripheral data should not be limited thereto or thereby, and the number of the non-effective data P_NA_ID2 and the number of the effective data P_A_ID2, which are included in the peripheral data, should not be particularly limited.

In a case where the reference effective data R_A_ID2 are set to the red image data R_D, the peripheral data may be also set to the red image data R_D. That is, data of pixels having different colors from those of pixels corresponding to the reference effective data R_A_ID2 may not be set to the peripheral data of the reference effective data R_A_ID2.

The data processor 112 may compensate for the reference effective data R_A_ID2 based on the peripheral data to generate the compensation data C_ID2. In addition, the data processor 112 may set each of the effective data A_ID2 to the reference effective data R_A_ID2 to perform a compensation operation on each of the effective data A_ID2. Because the operation after the compensation operation is the same as those described with reference to FIGS. 4A, 4B, and 5A to 5C, it will be omitted.

Figure 8A:
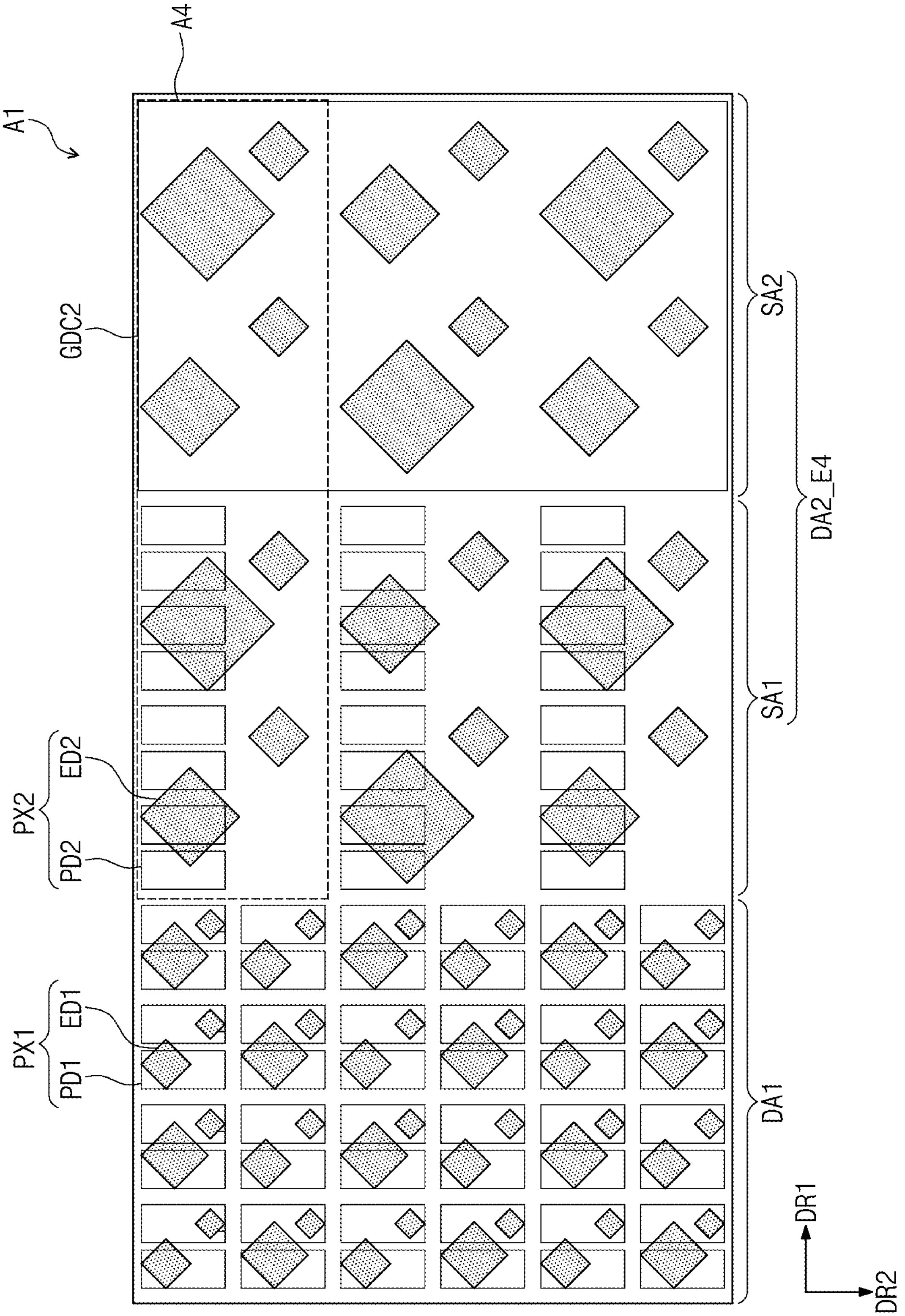
FIG. 8A is an enlarged plan view illustrating an area A1 shown in FIG. 2C according to an embodiment of the inventive concepts.
Figure 8B:
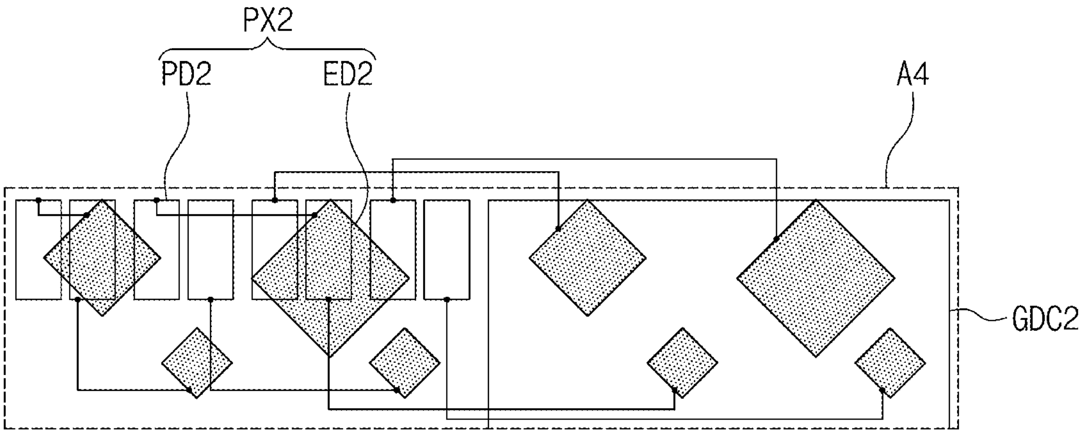
FIG. 8B is a view illustrating a connection relation between emission elements and pixel driving circuits of an area A4 shown in FIG. 8A.

FIG. 8A is an enlarged plan view illustrating an area A1 shown in FIG. 2C according to an embodiment of the inventive concepts, and FIG. 8B is a view illustrating a connection relation between emission elements and pixel driving circuits of an area A4 shown in FIG. 8A.

Referring to FIGS. 8A and 8B, the structure in which the number of the second pixels PX2 arranged per unit area in the second display area DA2 is reduced to one fourth (¼) of the number of the first pixels PX1 arranged per unit area in the first display area DA1 is illustrated, however, the inventive concepts should not be limited thereto or thereby. For example, the number of the second pixels PX2 arranged per unit area in the second display area DA2 may be reduced to one eight (⅛) or one sixteenth (1/16) of the number of the first pixels PX1 arranged per unit area in the first display area DA1. In this case, the term "unit area" may correspond to a size enough to cover at least eight or sixteen first pixels PX1.

However, when the first emission element ED1 is compared with the second emission element ED2 emitting the same color as that of the first emission element ED1, the first and second emission elements ED1 and ED2 may have different sizes and shapes from each other. The second emission element ED2 may have a size four times greater than a size of the first emission element ED1, however, the inventive concepts should not be limited thereto or thereby. For example, the second emission element ED2 may have a size two or three times greater than that of the first emission element ED1.

When comparing FIG. 8A with FIG. 6A, the size of the second pixel PX2 is changed, but the connection relation between the second pixels PX2 and the data lines DL2_1 to DL2_8 in the second display area DA2 is similar to that of FIG. 6B. Accordingly, although the second pixels PX2 are arranged as illustrated in FIG. 8A, the effective data A_ID2 corresponding to the second pixels PX2 may be also compensated for by a method similar to that described with reference to FIGS. 7A and 7B.

Figure 9A:
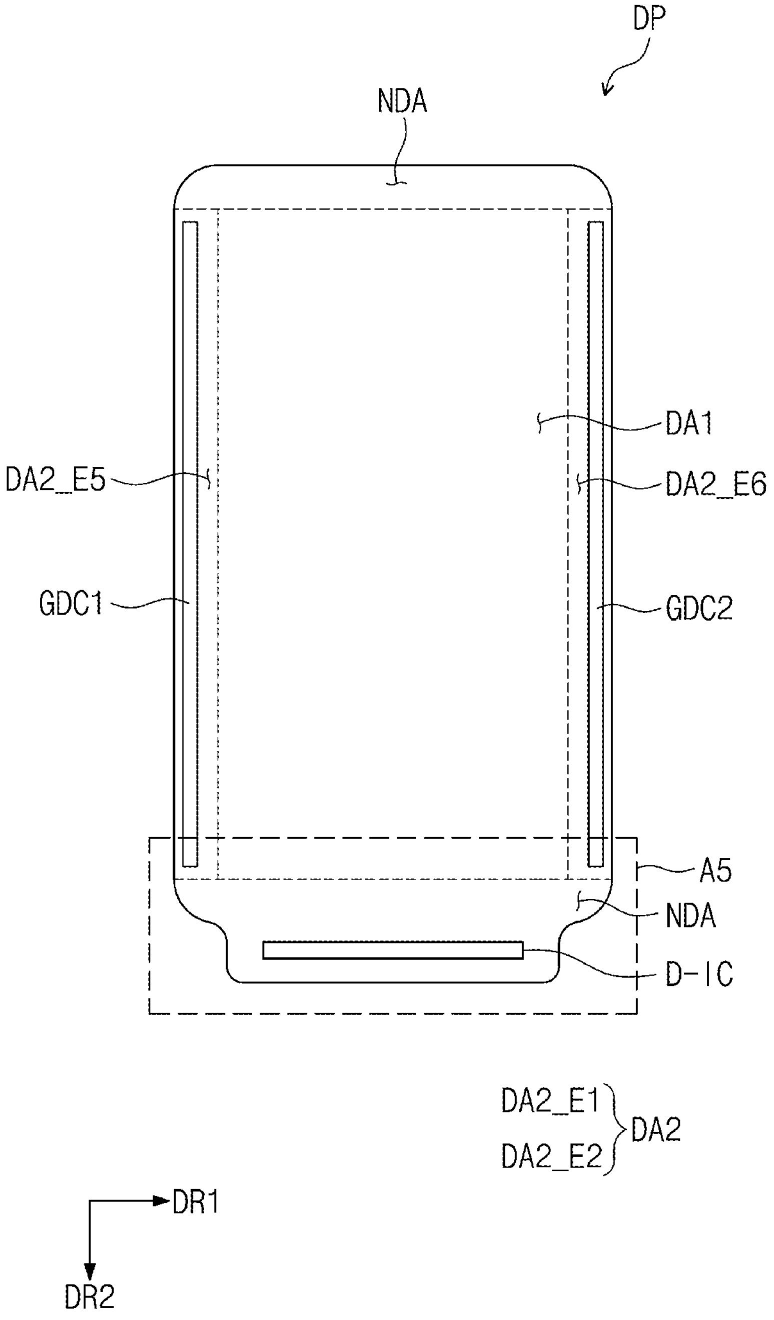
FIG. 9A is a plan view illustrating a display panel according to an embodiment of the inventive concepts.
Figure 9B:
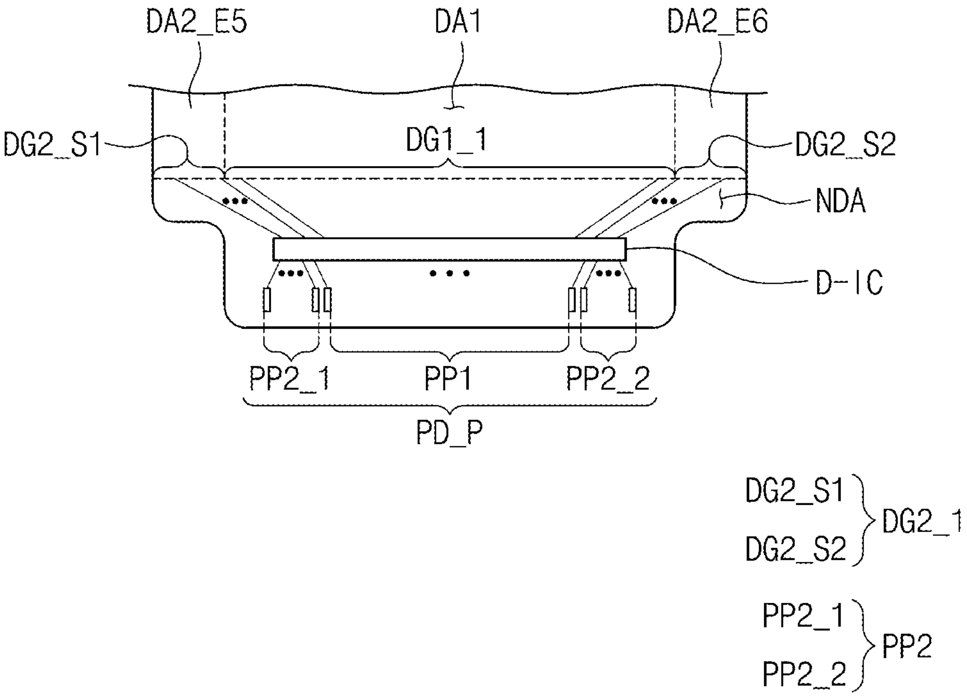
FIG. 9B is an enlarged plan view illustrating an area A5 shown in FIG. 9A.

FIG. 9A is a plan view illustrating a display panel DP according to an embodiment of the inventive concepts, and FIG. 9B is an enlarged plan view illustrating an area A5 shown in FIG. 9A.

Referring to FIG. 9A, the display panel DP may include a display area displaying an image. As an example, the display area may include a first display area DA1 and a second display area DA2. The first display area DA1 may be disposed parallel to the front surface portion FS of the window WM (refer to FIG. 2A) and may have a shape corresponding to the front surface portion FS. That is, the first display area DA1 may be a flat display area having a flat shape. The second display area DA2 may be disposed to correspond to one or more curved surface portions and one or more corner portions. The second display area DA2 may have a curved surface shape corresponding to the one or more curved surface portions and the one or more corner portions. However, the shape of the second display area DA2 should not be limited thereto or thereby, and the second display area DA2 may also have a flat surface shape.

The second display area DA2 may include first and second edge display areas DA2_E5 and DA2_E6. The first and second edge display areas DA2_E5 and DA2_E6 may be bent from first and second sides of the first display area DA1. The first and second edge display areas DA2_E5 and DA2_E6 may be bent from the first display area DA1 at a predetermined curvature. The first and second sides of the first display area DA1 may extend substantially parallel to the first direction DR1.

The display panel DP may further include a non-display area NDA around the second display area DA2. The non-display area NDA may be an area in which no image is displayed. The non-display area NDA may be defined at third and fourth sides of the first display area DA1.

Each of first and second gate drivers GDC1 and GDC2 may be disposed in the second display area DA2 or may be disposed to partially overlap the second display area DA2 and the second emission elements ED2. The partially overlapped area may refer to a portion of the second display area DA2 and the second emission elements ED2 therein. The first and second gate drivers GDC1 and GDC2 may be disposed to respectively overlap the first and second edge display areas DA2_E5 and DA2_E6. As an example, the first gate driver GDC1 may be disposed in the first edge display area DA2_E5, and the second gate driver GDC2 may be disposed in the second edge display area DA2_E6.

The increase in width of the non-display area NDA or the arrangement of the non-display area around the display area due to the first and second gate drivers GDC1 and GDC2 may be prevented. Consequently, a size of the non-display area NDA viewed to the user in the display device DD may be reduced due to the second display area DA2.

In the above description, the structure in which the second display area DA2 includes two edge display areas DA2_E5 and DA2_E6 in the display panel DP is described, however, the structure of the display panel DP according to the inventive concepts should not be limited thereto or thereby. That is, the second display area DA2 of the display panel DP may include only one edge display area.

Referring to FIGS. 9A and 9B, a first data line group DG1_1 may be disposed in the first display area DA1 of the display panel DP, and a second data line group DG2_1 may be disposed in the second display area DA2 of the display panel DP. The first data line group DG1_1 may include some of the data lines DL1 to DLm (refer to FIG. 2B), and the second data line group DG2_1 may include the other of the data lines DL1 to DLm.

In a case where the number of the entire data lines DL1 to DLm arranged in the display panel DP is 1440, the first data line group DG1_1 may include 1428 data lines, and the second data line group DG2_1 may include 12 data lines. The second data line group DG2_1 may include a first sub-data line group DG2_S1 disposed in the first edge display area DA2_E5 and a second sub-data line group DG2_S2 disposed in the second edge display area DA2_E6. Each of the first and second sub-data line groups DG2_S1 and DG2_S2 may include six data lines. The number of the data lines included in each of the data line groups DG1_1, DG2_S1 and DG2_S2 should not be particularly limited.

A driving chip D-IC may be mounted on the display panel DP. A panel pad portion PD_P may be provided adjacent to the driving chip D-IC in the display panel DP. The panel pad portion PD_P may include a first pad portion PP1 and a second pad portion PP2. The first pad portion PP1 may receive a signal to be applied to the first pixels PX1 (refer to FIG. 3A) arranged in the first display area DA1, and the second pad portion PP2 may receive a signal to be applied to the second pixels PX2 (refer to FIG. 3A) arranged in the second display area DA2.

The second pad portion PP2 may include a first sub-pad portion PP2_1 and a second sub-pad portion PP2_1. The first sub-pad portion PP2_1 may receive a signal to be applied to the second pixels PX2 arranged in the first edge display area DA2_E5, and the second sub-pad portion PP2_2 may receive a signal to be applied to the second pixels PX2 arranged in the second edge display area DA2_E6.

The driving chip D-IC may be connected to the panel pad portion PD_P. The driving chip D-IC may include the data driver 300 (refer to FIG. 2B). The data driver 300 may include a first driver electrically connected to the first pad portion PP1 and a second driver electrically connected to the second pad portion PP2. The driving chip D-IC will be described in detail with reference to FIG. 10B.

Figure 10A:
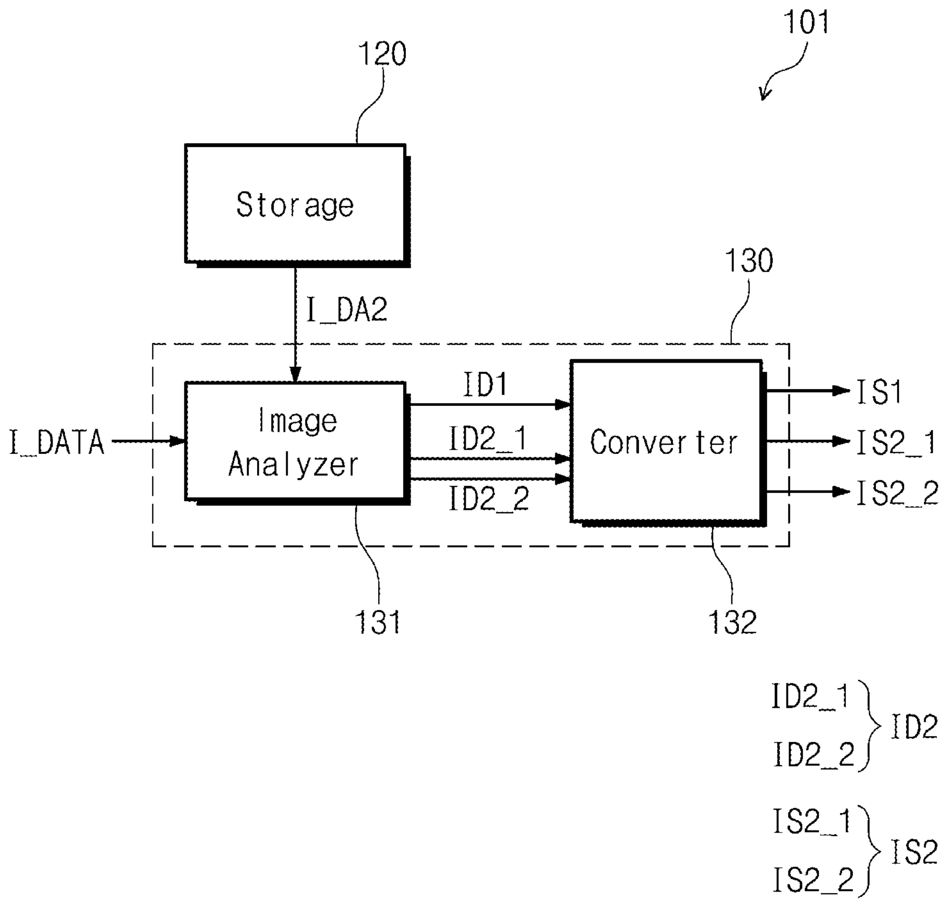
FIG. 10A is an inner block diagram illustrating a controller according to an embodiment of the inventive concepts.
Figure 10B:
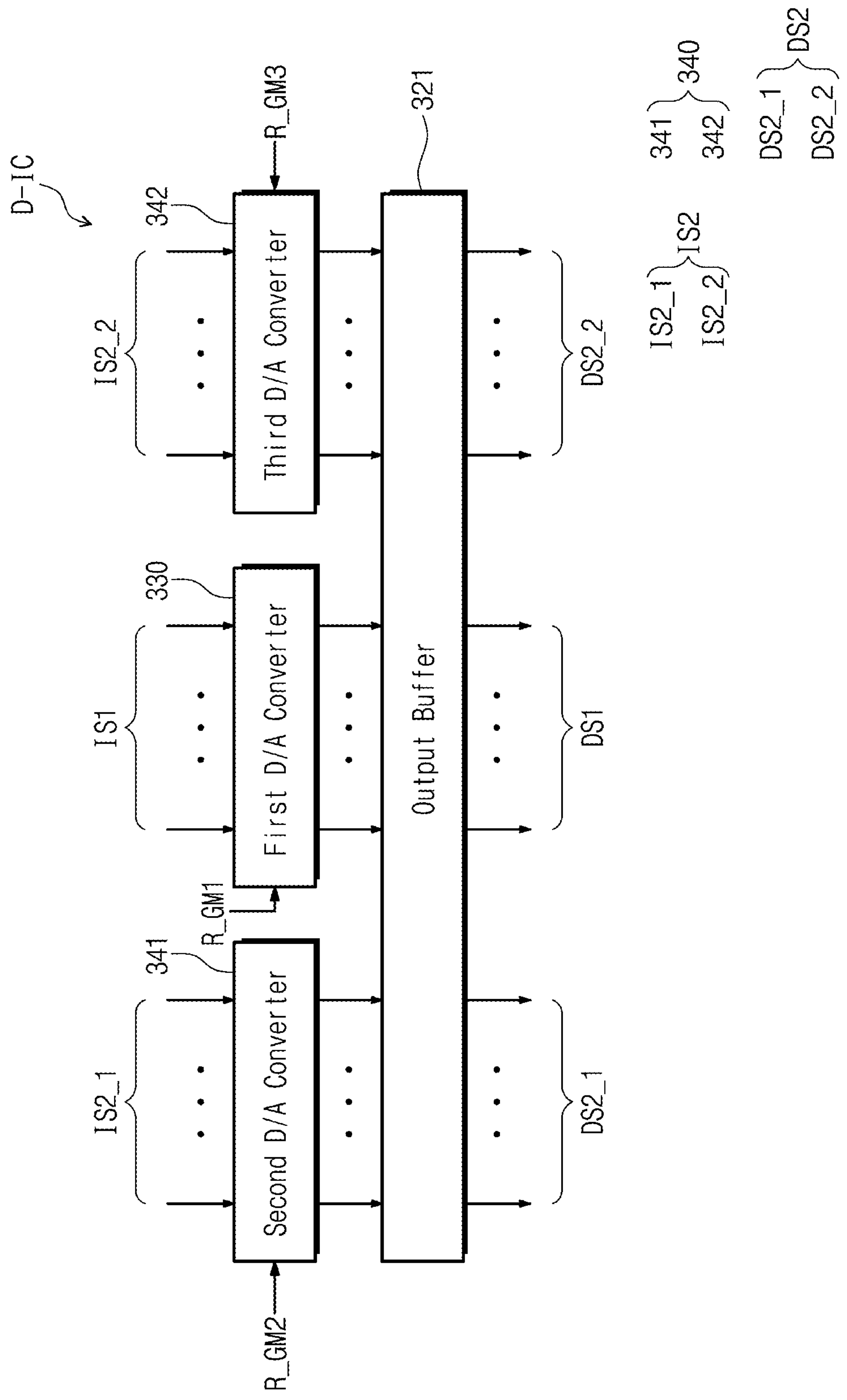
FIG. 10B is an inner block diagram illustrating a driving chip shown in FIG. 9B.

FIG. 10A is an inner block diagram illustrating a controller 101 according to an embodiment of the inventive concepts, and FIG. 10B is an inner block diagram illustrating the driving chip D-IC shown in FIG. 9B.

Referring to FIGS. 10A and 10B, the controller 101 may include a data converter 130 and a storage 120. The data converter 130 may include an image analyzer 131 and a converter 132. The storage 120 may store information I_DA2 with respect to the second display area DA2. As an example, the information I_DA2 may include information on the number of the second pixels PX2 arranged in the second display area DA2, a size of each of the second pixels PX2, a width of the second display area DA2, a position of the second pixels PX2, and the like.

The image analyzer 131 may receive image data I_DATA and may divide the image data I_DATA into first image data ID1 corresponding to the first display area DA1 and second image data ID2 corresponding to the second display area DA2 based on the information I_DA2. In this case, the second image data ID2 may be divided into first sub-image data ID2_1 and second sub-image data ID2_2. The first sub-image data ID2_1 may be data corresponding to the first edge display area DA2_E5 of the second display area DA2, and the second sub-image data ID2_2 may be data corresponding to the second edge display area DA2_E6 of the second display area DA2.

The converter 132 may receive the first and second image data ID1 and ID2 from the image analyzer 131. The converter 132 may convert the first image data ID1 to first image signals IS1 corresponding to the first pixels PX1 and may convert the second image data ID2 to second image signals IS2 corresponding to the second pixels PX2. The second image signals IS2 may include first sub-image signals IS2_1 obtained by converting the first sub-image data ID2_1 and second sub-image signals IS2_2 obtained by converting the second sub-image data ID2_2. The first and second image signals IS1 and IS2 may be provided to the driving chip D-IC.

The driving chip D-IC may receive the first image signals IS1 and the second image signals IS2 from the controller 101. The driving chip D-IC may include a first D/A converter 330 receiving the first image signals IS1, a second D/A converter 341 receiving the first sub-image signals IS2_1, and a third D/A converter 342 receiving the second sub-image signals IS2_2. The first D/A converter 330 may be included in the first driver, and the second and third D/A converters 341 and 342 may be included in a second driver 340.

The first D/A converter 330 may receive the first image signals IS1 and may convert the first image signals IS1 to the first data signals DS1 based on a predetermined first reference gamma R_GM1. The second D/A converter 341 may receive the first sub-image signals IS2_1 and may convert the first sub-image signals IS2_1 to the first sub-data signals DS2_1 based on a predetermined second reference gamma R_GM2. The third D/A converter 342 may receive the second sub-image signals IS2_2 and may convert the second sub-image signals IS2_2 to the second sub-data signals DS2_2 based on a predetermined third reference gamma R_GM3.

The first reference gamma R_GM1 may be different from the second and third reference gammas R_GM2 and R_GM3, and the second and third reference gammas R_GM2 and R_GM3 may be the same as each other or may be different from each other. The second and third D/A converters 341 and 342 may convert the image signal based on different reference gamma from that of the first D/A converter 330. Accordingly, although the first, second, and third D/A converters 330, 341, and 342 receive the image signals having the same grayscale as each other, the second and third D/A converters 341 and 342 may output the data signal with a voltage level different from a voltage level of the data signal output from the first D/A converter 330. For example, on the same grayscale, the second and third D/A converters 341 and 342 may output the data signal with a voltage level higher than a voltage level of the data signal output from the first D/A converter 330. Accordingly, a difference in brightness between the first display area DA1 and the second display area DA2 may be compensated.

The driving chip D-IC may further include an output buffer 321. The output buffer 321 may be connected to the first, second, and third D/A converters 330, 341, and 342. The output buffer 321 may control an output timing of the first and second data signals DS1 and DS2 output from the first, second, and third D/A converters 330, 341, and 342 and may substantially simultaneously output the first and second data signals DS1 and DS2. The first data signals DS1 output from the output buffer 321 may be applied to the first data line group DG1_1 illustrated in FIG. 9B. The second sub-data signals DS2_1 output from the output buffer 321 may be applied to the first sub-data line group DG2_S1 illustrated in FIG. 9B, and the third sub-data signals DS2_2 output from the output buffer 321 may be applied to the second sub-data line group DG2_S2 illustrated in FIG. 9B.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
a display panel including a plurality of first pixels disposed in a first display area and a plurality of second pixels disposed in a second display area adjacent to the first display area;
a gate driver disposed in the second display area of the display panel to overlap a portion of the second pixels and configured to drive the first and second pixels;
a controller configured to receive image data and convert the image data to image signals; and
a data driver configured to convert the image signals to data signals and outputting the data signals to the first and second pixels,
wherein the second display area comprises an effective area in which light emitting elements of the second pixels are disposed and a non-effective area in which the light emitting elements are not disposed, the non-effective area is disposed between the effective area and the first display area,
wherein the controller compensates for effective data corresponding to the second pixels and reflects the compensated effective data to the image signals,
the controller comprises:
a data compensator configured to extract image data with respect to the second display area from the image data, compensates for the effective data corresponding to the second pixels among the extracted image data using non-effective data corresponding to non-effective area among the extracted image data to generate compensation data, and provide the compensation data to the second pixel to prevent a phenomenon in which a boundary between the first display area and the effective area is viewed,
wherein the data compensator comprises:
an image analyzer configured to extract first image data with respect to the first display area and second image data with respect to the second display area from the image data; and
a data processor configured to receive the second image data, set reference effective data from the effective data, set peripheral data adjacent to the reference effective data, and compensate for the reference effective data based on the peripheral data to generate the compensation data,
wherein the peripheral data include at least one non-effective data and at least one adjacent effective data adjacent to the reference effective data.

2. The display device of claim 1, wherein the data compensator further comprises:
a synthesizer configured to synthesize the compensation data and the first image data to output the image signals.

3. The display device of claim 1, wherein the controller further comprises:
a storage to store information about the second display area,
wherein the image analyzer extracts the first and second image data from the image data based on the information.

4. The display device of claim 1, wherein each of the second pixels comprises:
a second emission element emitting a light; and
a second pixel driving circuit driving the second emission element, and the second display area comprises:
a first sub-area in which the second pixel driving circuits of the second pixels are arranged; and
a second sub-area in which the gate driver is disposed.

5. The display device of claim 4, wherein second emission elements of a first group among the second pixels are disposed on the second pixel driving circuits in the first sub-area, and second emission elements of a second group among the second pixels are disposed on the gate driver in the second sub-area.

6. The display device of claim 4, wherein a number of the second pixels arranged per unit area in the second display area is smaller than a number of the first pixels arranged per unit area in the first display area.

7. The display device of claim 6, wherein each of the second emission elements has a size equal to or greater than a size of each of the first emission elements.

* * * * *